United States Patent
Ausen et al.

(10) Patent No.: US 12,366,020 B2
(45) Date of Patent: Jul. 22, 2025

(54) NETTINGS

(71) Applicant: 3M INNOVATIVE PROPERTIES COMPANY, St. Paul, MN (US)

(72) Inventors: Ronald W. Ausen, St. Paul, MN (US); William J. Kopecky, Hudson, WI (US); Sebastian Goris, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1004 days.

(21) Appl. No.: 17/444,200

(22) PCT Filed: Feb. 18, 2020

(86) PCT No.: PCT/IB2020/051315
§ 371 (c)(1),
(2) Date: Aug. 2, 2021

(87) PCT Pub. No.: WO2020/170115
PCT Pub. Date: Aug. 27, 2020

(65) Prior Publication Data
US 2023/0357973 A1 Nov. 9, 2023

Related U.S. Application Data

(60) Provisional application No. 62/808,620, filed on Feb. 21, 2019.

(51) Int. Cl.
*D04H 3/16* (2006.01)
*B29C 48/00* (2019.01)
(Continued)

(52) U.S. Cl.
CPC ......... *D04H 3/163* (2013.01); *B29C 48/0021* (2019.02); *B29C 48/05* (2019.02); *B29C 48/345* (2019.02); *B29L 2028/00* (2013.01)

(58) Field of Classification Search
None
See application file for complete search history.

(56) References Cited

U.S. PATENT DOCUMENTS

| | | | |
|---|---|---|---|
| 3,019,147 A | 1/1962 | Nalle | |
| 3,274,315 A | 9/1966 | Kawamura | |
| (Continued) | | | |

FOREIGN PATENT DOCUMENTS

| | | |
|---|---|---|
| CA | 2592720 | 12/2007 |
| EP | 0624676 | 11/1994 |
| (Continued) | | |

OTHER PUBLICATIONS

International Search Report for PCT International Application No. PCT/IB2020/051315, mailed on May 14, 2020, 5 pages.

*Primary Examiner* — Arti Singh-Pandey

(57) ABSTRACT

Netting (100) comprising an array of polymeric strands (101, 102), wherein the polymeric strands (101, 102) are periodically joined together at bond regions (105) throughout the array with spaces (103, 109) between adjacent strands, wherein at least a plurality (i.e., at least two) of the strands are hollow polymeric strands (i.e., a hollow core (106) with a sheath (107) surrounding the hollow core), and wherein at least 50 percent by number of the strands do not substantially cross over each other. In some embodiments, the core comprises fluid. Embodiments of nettings described herein are useful for example, for thermal transport in thermal interface articles used to control the temperature of and/or dissipate heat for electronic components and batteries or mechanical devices.

7 Claims, 14 Drawing Sheets

(51) Int. Cl.
*B29C 48/05* (2019.01)
*B29C 48/345* (2019.01)
*B29L 28/00* (2006.01)

(56) References Cited

U.S. PATENT DOCUMENTS

| | | | |
|---|---|---|---|
| 3,372,920 | A | 3/1968 | Corbett |
| 3,471,588 | A | 10/1969 | Kanner |
| 3,935,357 | A | 1/1976 | Padovani |
| 4,136,220 | A | 1/1979 | Olabisi |
| 4,234,642 | A | 11/1980 | Olabisi |
| 4,381,912 | A | 5/1983 | Yamamoto |
| 4,707,393 | A | 11/1987 | Vetter |
| 5,427,316 | A | 6/1995 | Leone |
| 5,567,493 | A | 10/1996 | Imai |
| 5,948,517 | A | 9/1999 | Adamko |
| 6,228,449 | B1 | 5/2001 | Meyer |
| 6,348,249 | B2 | 2/2002 | Meyer |
| 6,465,107 | B1 | 10/2002 | Kelly |
| 6,787,216 | B1 | 9/2004 | Koenhen |
| 2003/0215613 | A1 | 11/2003 | Jan |
| 2005/0255295 | A1 | 11/2005 | Lin |
| 2011/0020574 | A1 | 1/2011 | Mackley |
| 2011/0217428 | A1 | 9/2011 | Vaman |
| 2014/0220328 | A1 | 8/2014 | Ausen |

FOREIGN PATENT DOCUMENTS

| | | |
|---|---|---|
| EP | 3381817 | 10/2018 |
| GB | 2103144 | 2/1983 |
| GB | 2408961 | 6/2005 |
| JP | 11090192 | 4/1999 |
| WO | WO 1996-039349 | 12/1996 |
| WO | WO 2001-008866 | 2/2001 |
| WO | WO 2003-051782 | 6/2003 |
| WO | 2009086161 A1 | 7/2009 |
| WO | WO 2012-094315 | 7/2012 |
| WO | WO 2012-094317 | 7/2012 |
| WO | WO 2013-009538 | 1/2013 |
| WO | 2013032683 A2 | 3/2013 |
| WO | WO 2014-003761 | 1/2014 |
| WO | WO 2016-091761 | 6/2016 |
| WO | WO 2020-003066 | 1/2020 |

NETTINGS

CROSS REFERENCE TO RELATED APPLICATIONS

This application is a national stage filing under 35 U.S.C. 371 of PCT/IB2020/051315, filed Feb. 18, 2020, which claims the benefit of U.S. Application No. 62/808,620, filed Feb. 21, 2019, the disclosure of which is incorporated by reference in its/their entirety herein.

BACKGROUND

Methods for making netting and continuous extruded tubing are known in the art. Today, many types of tubes and hoses are made with polymer materials (e.g., polyethylene) that are extruded using an extruder and extrusion die.

Relatively smaller sized tubing, such as capillary tubing and hollow fiber, require precision dies for consistent tube shape. This is because the flow rate of material is very dependent upon the resistance within the die. Small changes in the cavity size have significant effects on the resultant extruded part. Thus, for uniformity of flow, passageway resistance within the die is critical to the formation of uniform tubing.

Hollow fiber and capillary tubing can provide mass transfer if the tubing wall is permeable, and thermal transfer if the tubing wall is thermally conductive. It can provide padding and cushioning with elastomeric materials. The small size of the tubing can result in difficulty in managing multiple tubes at one time.

Connected webs of small sized tubing can be useful for padding and cushioning of fragile elements. The small tubes provide an air barrier for compression. Small tubing webs can be useful for heat transfer applications (e.g., battery, electronic, and mechanical apparatus cooling). The small tubing size enables close contact with the cooling media to the apparatus to be cooled. Small tubing webs may also be used as spacer layers to minimize weight.

There exists a need for alterative tube configurations and methods to make them.

SUMMARY

In one aspect, the present disclosure describes a first netting comprising an array of (typically adjacent) polymeric strands, wherein the polymeric strands are periodically joined together at bond regions throughout the array with spaces between adjacent strands (i.e., between bond regions the bonded strands for each respective bond region are separated), wherein at least a plurality (i.e., at least two) of the strands are hollow polymeric strands (i.e., a hollow core with a sheath surrounding the hollow core), and wherein the strands do not substantially cross over each other (i.e., at least 50 (at least 55, 60, 65, 70, 75, 80, 85, 90, 95, 99, or even 100) percent by number do not cross over each other).

In another aspect, the present disclosure describes a method for making first netting described herein, the method comprising:

providing an extrusion die comprising a plurality of shims positioned adjacent to one another, the shims together defining at least a first cavity, a second cavity, and a third cavity, and a dispensing surface, wherein the dispensing surface has an array of alternating dispensing orifices, wherein the plurality of shims comprises a plurality of a repeating sequence of shims, wherein the repeating sequence comprises: shims that provide a fluid passageway between the first cavity and a first plurality of orifices, shims that provide a second passageway extending from the second cavity to a second plurality of enclosed polygon shaped orifices, and also that provide a third passageway extending from a third cavity to a third plurality of orifices located within the enclosed polygon orifice area; and dispensing first polymeric strands from the first dispensing orifices at a first strand speed while simultaneously dispensing second polymeric strands from the second dispensing orifices at a second strand speed, and providing an open air passageway for the third cavity and the third dispensing orifices, wherein the first strand speed is at least 2 (in some embodiments, in a range from 2 to 6, or even 2 to 4) times the second strand speed to provide the netting.

In another aspect, the present disclosure describes a second netting comprising an array of (typically adjacent) polymeric strands, wherein the polymeric strands are periodically joined together at bond regions throughout the array, wherein at least a plurality (i.e., at least two) of the strands each have a core, wherein at least some cores (in some embodiments, each core) comprise (in some embodiments, consisting essentially of) fluid (e.g., at least one of gas (e.g., air) or liquid (e.g., water, ethylene glycol, or mineral oil)) (i.e., a sheath surrounding the core), and wherein the strands do not substantially cross over each other (i.e., at least 50 (at least 55, 60, 65, 70, 75, 80, 85, 90, 95, 99, or even 100) percent by number do not cross over each other).

In another aspect, the present disclosure describes a method for making second netting described herein, the method comprising:

providing an extrusion die comprising a plurality of shims positioned adjacent to one another, the shims together defining at least a first cavity, a second cavity, and a third cavity, and a dispensing surface, wherein the dispensing surface has an array of alternating dispensing orifices, wherein the plurality of shims comprises a plurality of a repeating sequence of shims, wherein the repeating sequence comprises: shims that provide a fluid passageway between the first cavity and a first plurality of orifices, shims that provide a second passageway extending from the second cavity to a second plurality of enclosed polygon shaped orifices, and also that provide a third passageway extending from a third cavity to a third plurality of orifices located within the enclosed polygon orifice area; and dispensing first polymeric strands from the first dispensing orifices at a first strand speed while simultaneously dispensing second polymeric strands from the second dispensing orifices at a second strand speed and fluid from the third dispensing orifices, wherein the first strand speed is at least 2 (in some embodiments, in a range from 2 to 6, or even 2 to 4) times the second strand speed to provide the netting.

Nettings described herein have a variety of uses, including padding and cushioning devices (e.g., pillows, protective mats, protective padding).

In some embodiments, it may be desirable for the sheathed core to comprise a fluid (e.g., at least one of gas (e.g., air), liquid (e.g., water, ethylene glycol, or mineral oil), or viscous fluid (e.g., thermal grease)) in the core, for example, for thermal transport in thermal interface articles used to control the temperature of and/or dissipate heat for electronic components and batteries or mechanical devices.

In some embodiments, it may be desirable for the sheathed core to comprise an endothermic material (e.g., wax) in the core which absorbs heat when it melts and releases heat when it solidifies. Such embodiments may be useful, for example, for electronic components and batteries or mechanical devices.

In some embodiments, it may be desirable for the area surrounding and within the netting to comprise a viscous fluid (e.g., at least one of liquid or solid (e.g., thermal grease)) within the netting, for example, for thermal transport in thermal interface articles used to control the temperature of and/or dissipate heat for electronic components and batteries or mechanical devices.

In some embodiments, it may be desirable for the area surrounding and within the netting to comprise an endothermic material (e.g., wax) in the core which absorbs heat when it melts and releases heat when it solidifies. Such embodiments may be useful, for example, for electronic components and batteries or mechanical devices.

DETAILED DESCRIPTION

Figure 1:
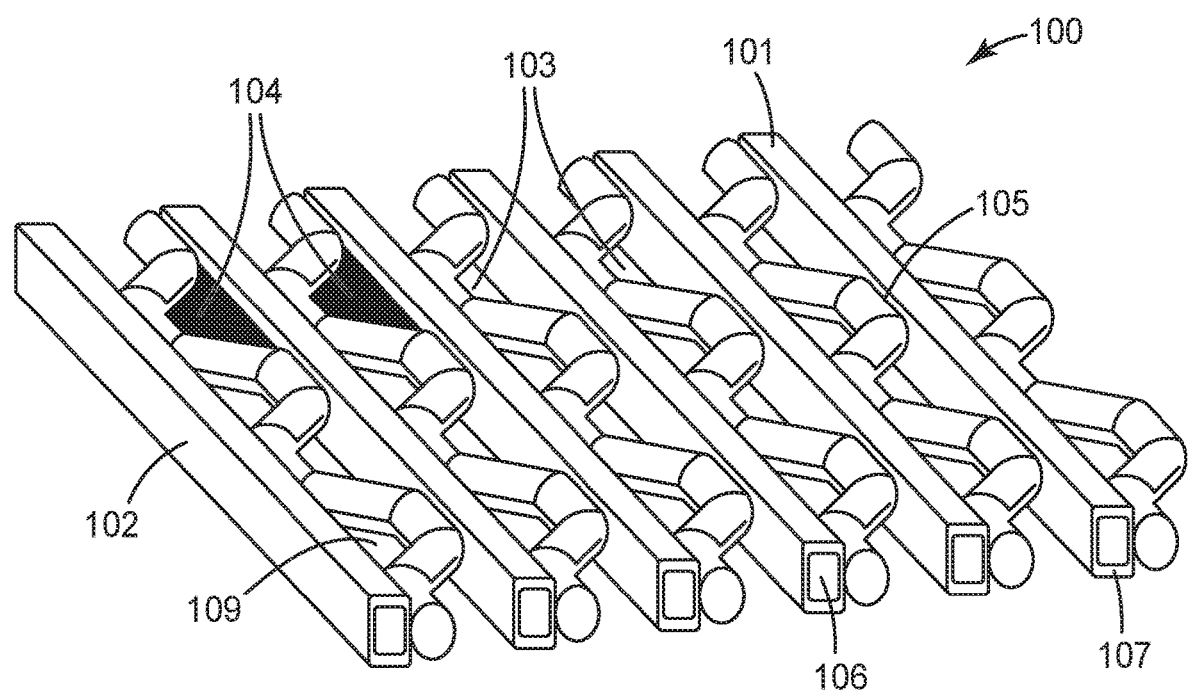
FIG. 1 is a schematic cross-sectional view of an exemplary coextruded polymeric article described herein.

Referring to FIG. 1, exemplary first netting 100 comprises array 101 of polymeric strands 102. Polymeric strands 102 are periodically joined together at bond regions 105 throughout array 101 with spaces 103 between adjacent strands (i.e., between bond regions the bonded strands for each respective bond region are separated). As shown, at least some of spaces 103 are filled with thermally conductive materials (i.e., materials having a thermal conductivity of at least 0.5 watt per meter kelvin) 104. At least a plurality (i.e., at least two) of strands 102 are hollow polymeric strands (i.e., a hollow core 106 with a sheath 107 surrounding the hollow core). Strands 102 do not substantially cross over each other (i.e., at least 50 percent by number do not cross over each other). Netting 100 comprises openings 103. In some embodiments, openings 103 are at least one of hexagonal-shaped or diamond shaped.

Figure 2:
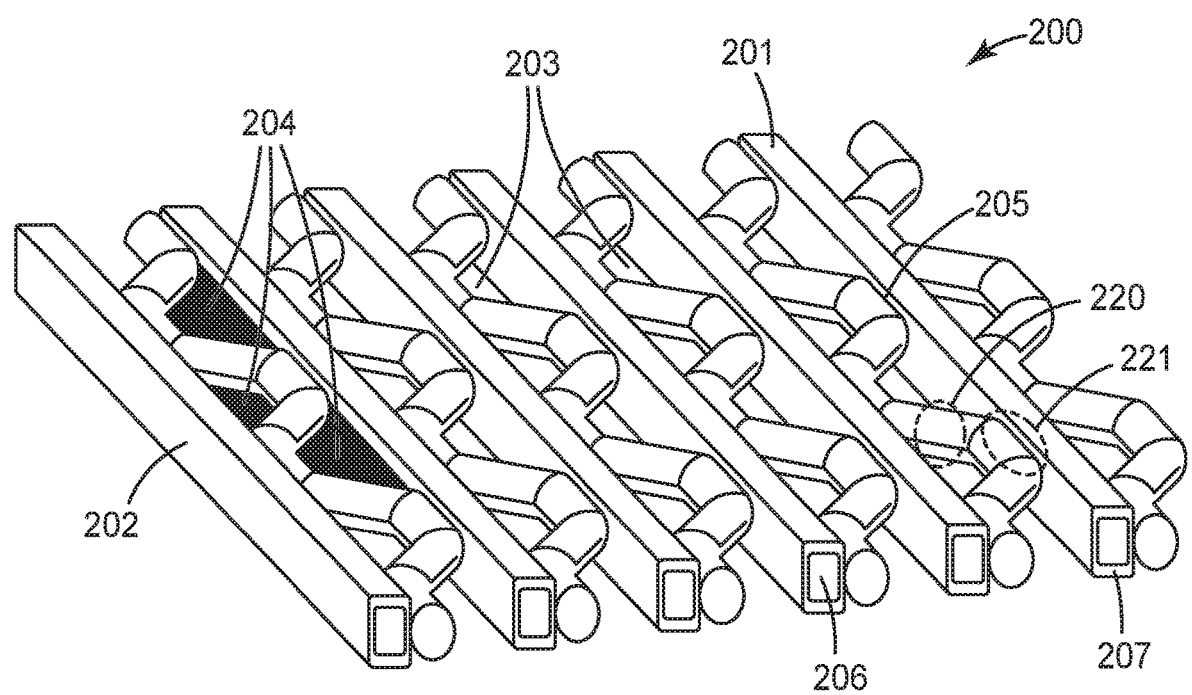
FIG. 2 is a schematic cross-sectional view of another exemplary coextruded polymeric article described herein.

Referring to FIG. 2, exemplary second netting 200 comprises array 201 of polymeric strands, wherein the polymeric strands are periodically joined together at bond regions 205 throughout the array, with spaces 203 between adjacent strands (i.e., between bond regions the bonded strands for each respective bond region are separated). As shown, at least some of spaces 203 are filled with thermally conductive materials (i.e., materials having a thermal conductivity of at least 0.5 watt per meter kelvin) 204. At least a plurality (i.e., at least two) of the strands each have a core 206 comprising fluid (e.g., at least one of gas (e.g., air) or liquid (e.g., water, ethylene glycol, or mineral oil)) (i.e., a sheath 207 surrounding the core). Strands 202 do not substantially cross over each other (i.e., at least 50 percent by number do not cross over each other). Netting 200 comprises openings 203. In some embodiments, openings 203 are at least one of hexagonal-shaped or diamond shaped. Regions 220 and 221 are shown for measurement of the demarcation in bond region 205.

"Bond regions" as used herein refers to a line of demarcation between two strands bonded together. A demarcation line or boundary region can be detected as described in the Examples using Differential Scanning Calorimetry (DSC). Bonds are formed when two adjacent molten polymer strands collide with each other. Adjacent strands are extruded at alternating speeds such that adjacent molten strands continually collide, forming bonds, and then part, forming the net openings. Strands are extruded in the same direction, and thus, these bonds are parallel bonds, all formed in the same direction. The bonds are in the same plane, they do not cross over each other. For a given strand there is a first strand on one side which intermittently bonds, and a second strand on the opposite side which is also intermittently bonded. Bond regions are continuations of the two strands, and thus the bond region comprises the sum of the two adjacent strands. Typically, strands continue without disconnect and can be followed continuously through the bond regions.

Embodiments of nettings described herein can be made, for example by a method comprising:

providing an extrusion die comprising a plurality of shims positioned adjacent to one another, the shims together defining at least a first cavity, a second cavity, and a third cavity, and a dispensing surface, wherein the dispensing surface has an array of alternating dispensing orifices, wherein the plurality of shims comprises a plurality of a repeating sequence of shims, wherein the repeating sequence comprises: shims that provide a fluid passageway between the first cavity and a first plurality of orifices, shims that provide a second passageway extending from the second cavity to a second plurality of enclosed polygon shaped orifices, and shims that provide a third passageway extending from a third cavity to a third plurality of orifices located within the enclosed polygon area of the second plurality of orifices; and dispensing first polymeric strands from the first dispensing orifices at a first strand speed while simultaneously dispensing second polymeric strands from the second dispensing orifices at a second strand speed, wherein the first strand speed is at least 2 (in some embodiments, in a range from 2 to 6, or even 2 to 4) times the second strand speed to provide the netting. In some embodiments, the third passageway is filled with air and free of material. In some embodiments, dispensing filler material (e.g., a fluid) from the third dispensing orifices.

Embodiments of nettings described herein can be made, for example by a method comprising:

providing an extrusion die comprising a plurality of shims positioned adjacent to one another, the shims together defining at least a first cavity, a second cavity, and a third cavity, and a dispensing surface, wherein the dispensing surface has an array of alternating dispensing orifices, wherein the plurality of shims comprises a plurality of a repeating sequence of shims, wherein the repeating sequence comprises: shims that provide a fluid passageway between the first cavity and a first plurality of orifices, shims that provide a second passageway extending from the second cavity to a second plurality of enclosed polygon shaped orifices, and shims that provide a third passageway extending from a third cavity to a third plurality of orifices located within the enclosed polygon area of the second plurality of orifices; and dispensing first polymeric strands from the first dispensing orifices at a first strand speed while simultaneously dispensing second polymeric strands from the second dispensing orifices at a second strand speed and a fluid from the third dispensing orifices, wherein the first strand speed is at least 2 (in some embodiments, in a range from 2 to 6, or even 2 to 4) times the second strand speed to provide the netting.

In some embodiments, the plurality of shims comprises a plurality of at least one repeating sequence of shims that includes shims that provide a passageway between a first and second cavity and the first dispensing orifices. In some of these embodiments, there will be additional shims that provide a passageway between the first and/or the second cavity, and/or a third (or more) cavity and second dispensing orifices. Typically, not all of the shims of dies described herein have passageways, as some may be spacer shims that provide no passageway between any cavity and a dispensing orifice. In some embodiments, there is a repeating sequence that further comprises at least one spacer shim. The number of shims providing passageway to the first dispensing orifices may be equal or unequal to the number of shims providing a passageway to the second dispensing orifices.

In some embodiments, the first dispensing orifices and the second dispensing orifices are collinear. In some embodiments, the first dispensing orifices are collinear, and the second dispensing orifices are also collinear but offset from and not collinear with the first dispensing orifices.

In some embodiments, extrusion dies described herein include a pair of end blocks for supporting the plurality of shims. In these embodiments it may be convenient for one or all of the shims to each have one or more through-holes for the passage of connectors between the pair of end blocks. Bolts disposed within such through-holes are one convenient approach for assembling the shims to the end blocks, although the ordinary artisan may perceive other alternatives for assembling the extrusion die. In some embodiments, the at least one end block has an inlet port for introduction of fluid material into one, or both, of the cavities.

Figure 9:
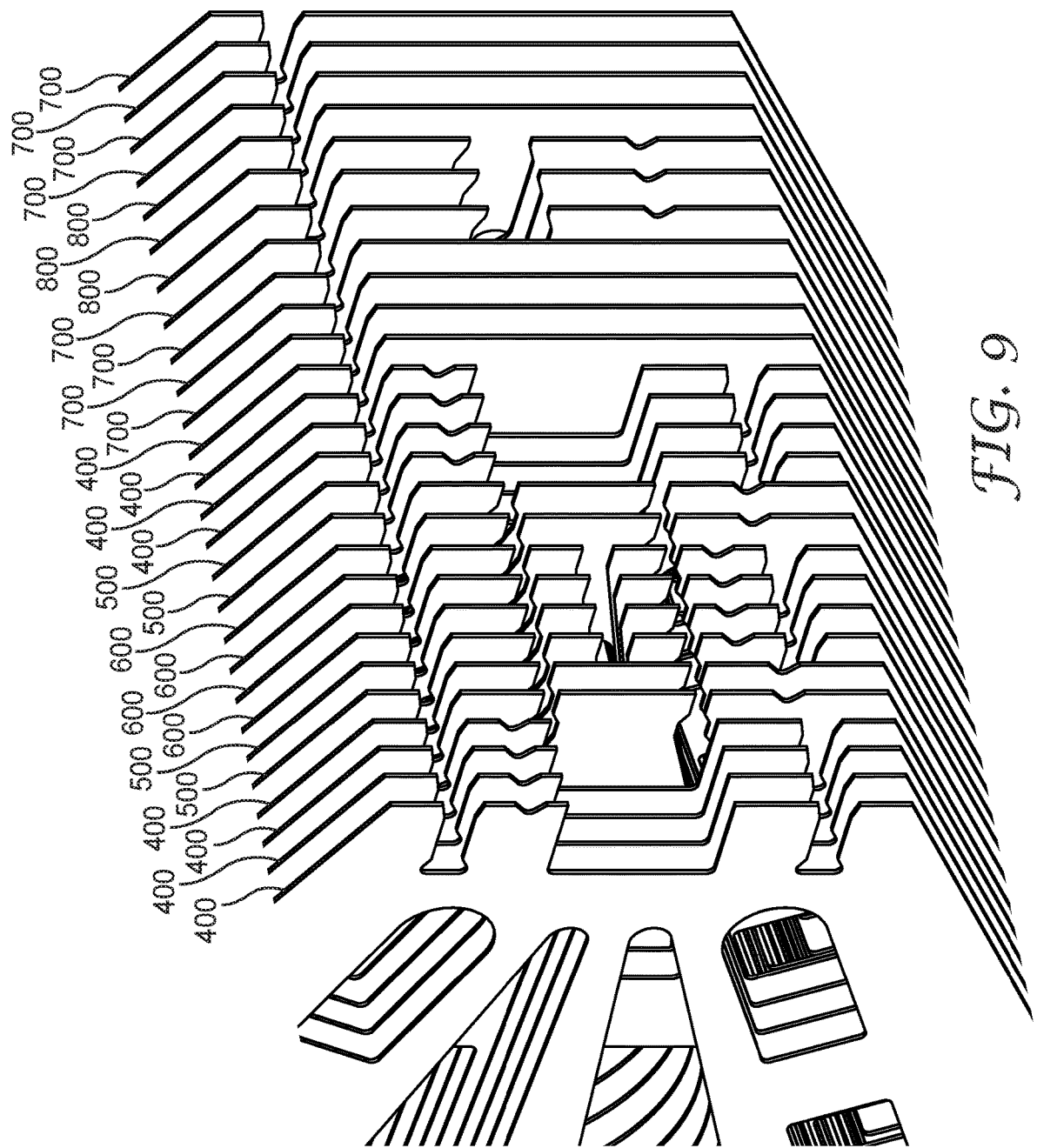
FIG. 9 is a perspective assembly drawing of several different exemplary sequences of shims employing the shims of FIGS. 4A, 5A, 6A, 7A, and 8A for making exemplary coextruded polymeric articles described herein, segments and protrusions in a repeating arrangement as shown in FIGS. 1 and 2, further exploded to reveal some individual shims.
Figure 10:
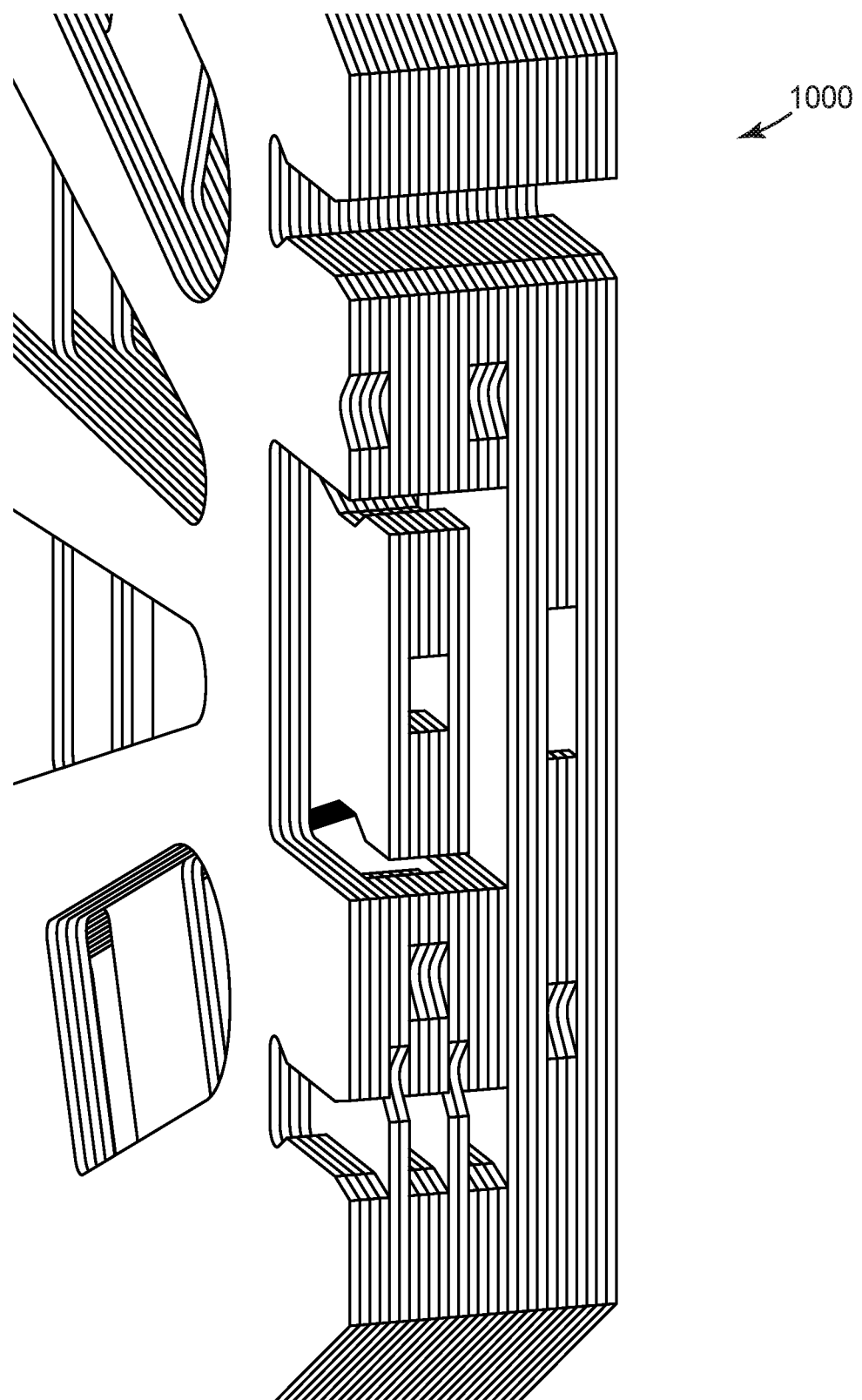
FIG. 10 is a perspective view of the sequence of shims of FIG. 9.

In some embodiments, the shims will be assembled according to a plan that provides a repeating sequence of shims of diverse types. The repeating sequence can have diverse numbers of shims per repeat. For example, a twenty seven shim repeating sequence that can provide a netting with a single-material strand alternating with a core/sheath strand is shown in FIGS. 9 and 10, which are further described below.

Exemplary passageway cross-sectional shapes include square and rectangular shapes. The shape of the passageways within, for example, a repeating sequence of shims, may be identical or different. For example, in some embodiments, the shims that provide a passageway between the first cavity and a first dispensing orifice might have a flow restriction compared to the shims that provide a conduit between the second cavity and a second dispensing orifice. The width of the distal opening within, for example, a repeating sequence of shims, may be identical or different. For example, the portion of the distal opening provided by the shims that provide a conduit between the first cavity and a first dispensing orifice could be narrower than the portion of the distal opening provided by the shims that provide a conduit between the second cavity and a second dispensing orifice.

In some embodiments, the assembled shims (conveniently bolted between the end blocks) further comprise a manifold body for supporting the shims. The manifold body has at least one (or more (e.g., two, three, four, or more)) manifold therein, the manifold having an outlet. An expansion seal (e.g., made of copper or alloys thereof) is disposed so as to seal the manifold body and the shims, such that the expansion seal defines a portion of at least one of the cavities (in some embodiments, a portion of both the first and second cavities), and such that the expansion seal allows a conduit between the manifold and the cavity.

In some embodiments, with respect to extrusion dies described herein, each of the dispensing orifices of the first and the second arrays have a width, and each of the dispensing orifices of the first and the second arrays are separated by up to 2 times the width of the respective dispensing orifice.

Typically, the passageway between cavity and dispensing orifice is up to 5 mm in length. Sometimes the first array of fluid passageways has greater fluid restriction than the second array of fluid passageways.

In some embodiments, for extrusion dies described herein, each of the dispensing orifices of the first and the second arrays have a cross sectional area, and each of the dispensing orifices of the first arrays has an area different than that of the second array.

Typically, the spacing between orifices is up to 2 times the width of the orifice. The spacing between orifices is greater than the resultant diameter of the strand after extrusion. This diameter is commonly called die swell. This spacing between orifices is greater than the resultant diameter of the strand after extrusion leads to the strands repeatedly colliding with each other to form the repeating bonds of the netting. If the spacing between orifices is too great the strands will not collide with each other and will not form the netting.

The shims for dies described herein typically have thicknesses in the range from 50 micrometers to 125 micrometers, although thicknesses outside of this range may also be useful. Typically, the fluid passageways have thicknesses in a range from 50 micrometers to 750 micrometers, and lengths less than 5 mm (with generally a preference for smaller lengths for decreasingly smaller passageway thicknesses), although thicknesses and lengths outside of these ranges may also be useful. For large diameter fluid passageways several smaller thickness shims may be stacked together, or single shims of the desired passageway width may be used.

The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the extrusion orifice, as misalignment can lead to strands extruding at an angle out of the die which inhibits desired bonding of the net. To aid in alignment, an alignment key can be cut into the shims. Also, a vibrating table can be useful to provide a smooth surface alignment of the extrusion tip.

Figure 3:
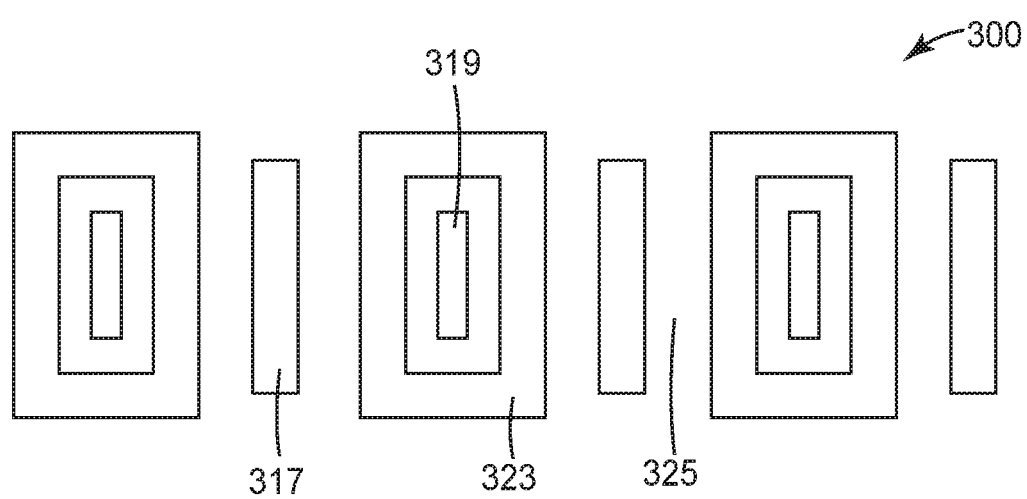
FIG. 3 is a schematic cross-sectional view of an exemplary die cavity pattern at the dispensing surface of the die employed in the formation of an exemplary coextruded polymeric article described herein.

Referring to FIG. 3, a schematic cross-sectional view of an exemplary die orifice pattern at the dispensing surface of the die employed in the formation of an exemplary coextruded polymeric article described herein is shown. Orifice plan 300 shows first orifices 317, second orifices 323, third orifices 319. As will be described in detail later, the orifices are spaced apart at spacing 325 to enable intermittent bonding of parallel extruded molten strands which occurs when alternating strands at different speed continually collide and break apart from each other. Orifice 323 is an enclosed polygon shape to form the hollow strand. Orifice 319 is located within enclosed polygon 323 and provides filler to prevent collapse of the hollow strand when formed.

Figure 4A:
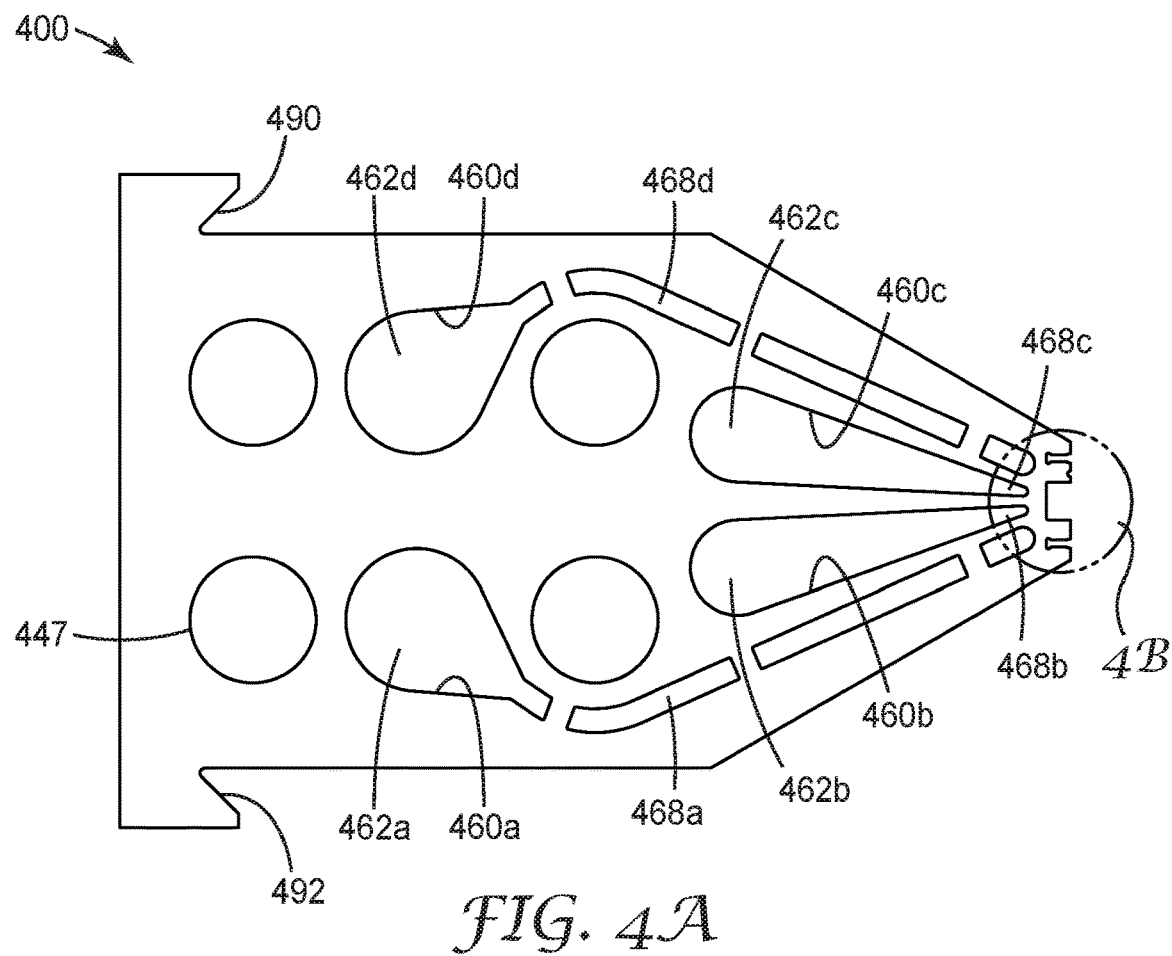
FIG. 4A is a plan view of an exemplary embodiment of a shim suited to form a sequence of shims capable of forming an exemplary coextruded polymeric article, for example, as shown in the schematic cross-sectional views of FIGS. 1 and 2.
Figure 4B:
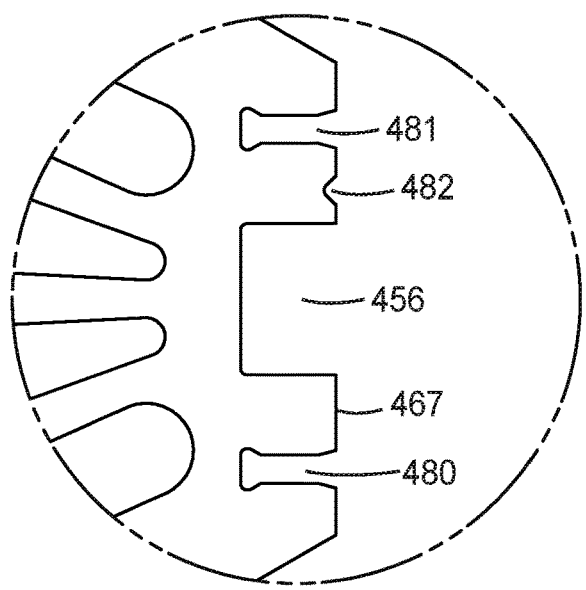
FIG. 4B is an expanded region near the dispensing surface of the shim shown in FIG. 4A.

Referring now to FIGS. 4A and 4B, shim 400 is illustrated. Shim 400 has first aperture 460a, second aperture 460b, third aperture 460c and fourth aperture 460d. When shim 400 is assembled with others as shown in FIGS. 9 and 10, aperture 460a will help define first cavity 462a, aperture 460b will help define second cavity 462b, aperture 460c will help define third cavity 462c and aperture 460d will help define fourth cavity 462d. Shim 400 has passageways 468a, 468b, 468c, and 468d cooperate with analogous passageways on adjacent shims to allow passage from cavities 462a, 462b, 462c, and 462d to the dispensing surfaces of the appropriate shims when the shims are assembled as shown in FIGS. 9 and 10.

Shim 400 has several holes 447 to allow the passage of, for example, bolts, to hold shim 400 and others to be described below into an assembly. Shim 400 also has dispensing surface 467, and in this embodiment, dispensing surface 467 has indexing groove 480 and 481 which can receive an appropriately shaped key to ease assembling diverse shims into a die. The shim may also have identification notch 482 to help verify that the die has been assembled in the desired manner. This embodiment has shoulders 490 and 492 which can assist in mounting the assembled die with a mount of the type shown in FIG. 12. Shim 400 has dispensing opening 456, in dispensing surface 467. Dispensing opening 456 may be more clearly seen in the expanded view shown in FIG. 4B. Dispensing opening 456 has no connection to cavities 462a, 462b, 462c, or 462d. As can be seen in FIGS. 9, and 10, adjacent shims complete the passageway to shim 400 opening 456, where this shim creates the sidewall orifice of the hollow strand shape.

Figure 5A:
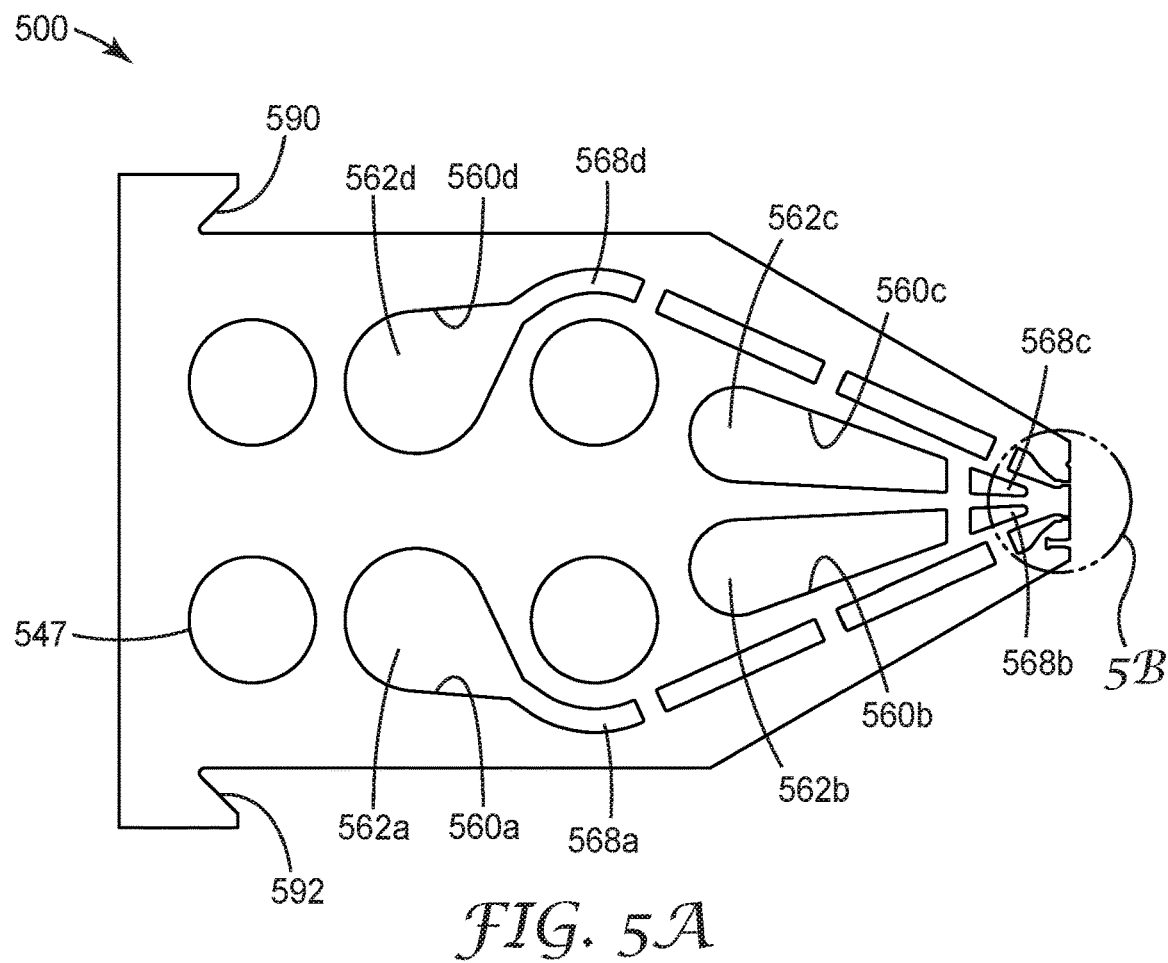
FIG. 5A is a plan view of an exemplary embodiment of a shim suited to form a sequence of shims capable of forming a coextruded polymeric article, for example, as shown in the schematic cross-sectional views of FIGS. 1 and 2.
Figure 5B:
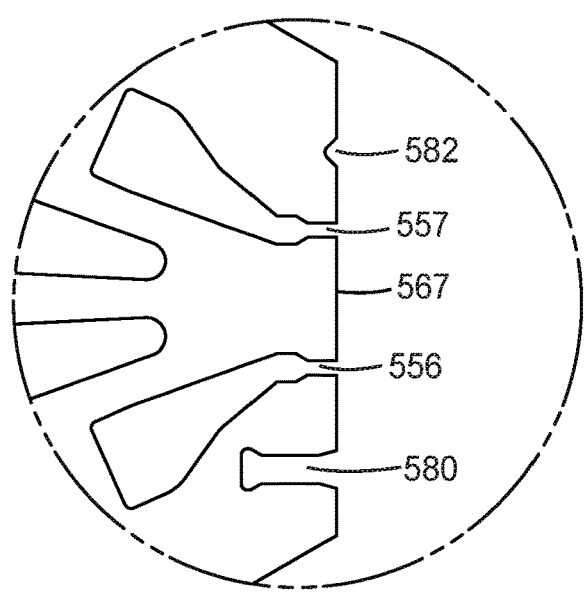
FIG. 5B is an expanded region near the dispensing surface of the shim shown in FIG. 5A.

Referring now to FIGS. 5A and 5B, shim 500 is illustrated. Shim 500 has first aperture 560a, second aperture 560b, third aperture 560c, and fourth aperture 560d. When shim 500 is assembled with others as shown in FIGS. 9 and 10, aperture 560a will help define first cavity 562a, aperture 560b will help define second cavity 562b, aperture 560c will help define third cavity 562c, and aperture 560d will help define fourth cavity 562d. Shim 500 has passageways 568a, 568b, 568c, and 568d cooperate with analogous passageways on adjacent shims to allow passage from cavities 562a, 562b, 562c, and 562d to the dispensing surfaces of the appropriate shims when the shims are assembled as shown in FIGS. 9 and 10. Analogous to shim 400, shim 500 has dispensing surface 567, and in this particular embodiment, dispensing surface 567 has indexing groove 580, identification notch 582, and shoulders 590 and 592. Shim 500 has dispensing orifices 556 and 557. Dispensing openings 556 and 557 may be more clearly seen in the expanded view shown in FIG. 5B. Dispensing opening 556 has connection to cavities 562a. Dispensing opening 557 has connection to cavity 562d. It might seem that there is no path from cavity 562a to dispensing orifice 556, via, for example, passageway 568a, but this is an illusion—the flow has a route in the perpendicular-to-the-plane-of-the-drawing dimension when the repeating sequence of FIGS. 9 and 10 is completely assembled. As can be seen in FIGS. 9 and 10, shim 500 helps complete the orifice to create the hollow strand.

Figure 6A:
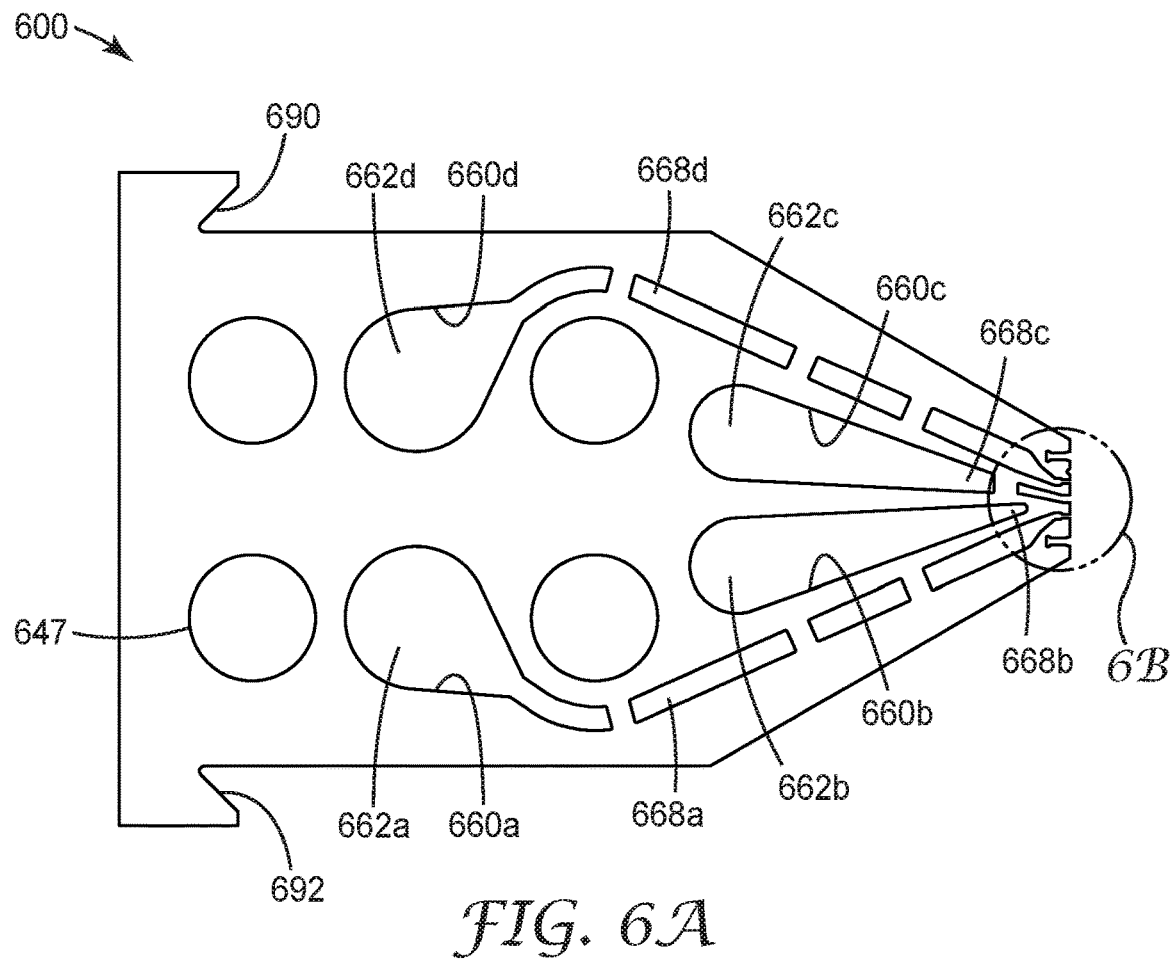
FIG. 6A is a plan view of an exemplary embodiment of a shim suited to form a sequence of shims capable of forming a coextruded polymeric article, for example, as shown in the schematic cross-sectional views of FIGS. 1 and 2.
Figure 6B:
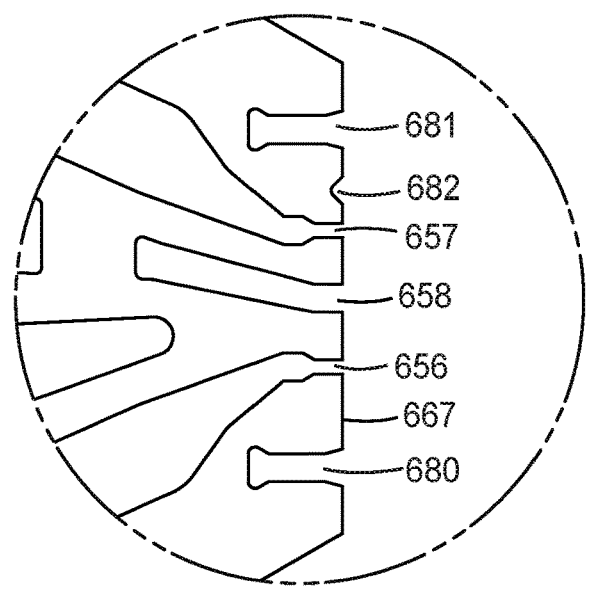
FIG. 6B is an expanded region near the dispensing surface of the shim shown in FIG. 6A.

Referring now to FIGS. 6A and 6B, shim 600 is illustrated. Shim 600 has first aperture 660a, second aperture 660b, third aperture 660c, and fourth aperture 660d. When shim 600 is assembled with others as shown in FIGS. 9 and 10, aperture 660a will help define first cavity 662a, aperture 660b will help define second cavity 662b, aperture 660c will help define third cavity 662c, and aperture 660d will help define cavity 662d. Shim 600 has passageways 668a, 668b, 668c, and 668d cooperate with analogous passageways on adjacent shims to allow passage from cavities 662a, 662b, 662c, and 662d to the dispensing surfaces of the appropriate shims when the shims are assembled as shown in FIGS. 9 and 10. Analogous to shim 400, shim 600 has dispensing surface 667, and in this particular embodiment, dispensing surface 667 has indexing groove 680 and 681, an identification notch 682, and shoulders 690 and 692. Shim 600 has dispensing orifices 656, 657, and 658. Dispensing openings 656, 657, and 658 may be more clearly seen in the expanded view shown in FIG. 6B. Dispensing opening 656 has connection to cavity 662a. Dispensing opening 657 has connection to cavity 662d. And dispensing opening 658 has connection to cavity 662c. Dispensing orifices 656 and 658 form portions of the enclosed polygon orifice for the hollow strand. Dispensing orifice 657 forms a portion of the orifice within the enclosed polygon. Material fed to this interior orifice prevents the collapse of the hollow strand. Shim 600 has two indexing grooves 680 and 681. This enables the use of either cavity 662c or cavity 662b for the filler material.

Figure 7A:
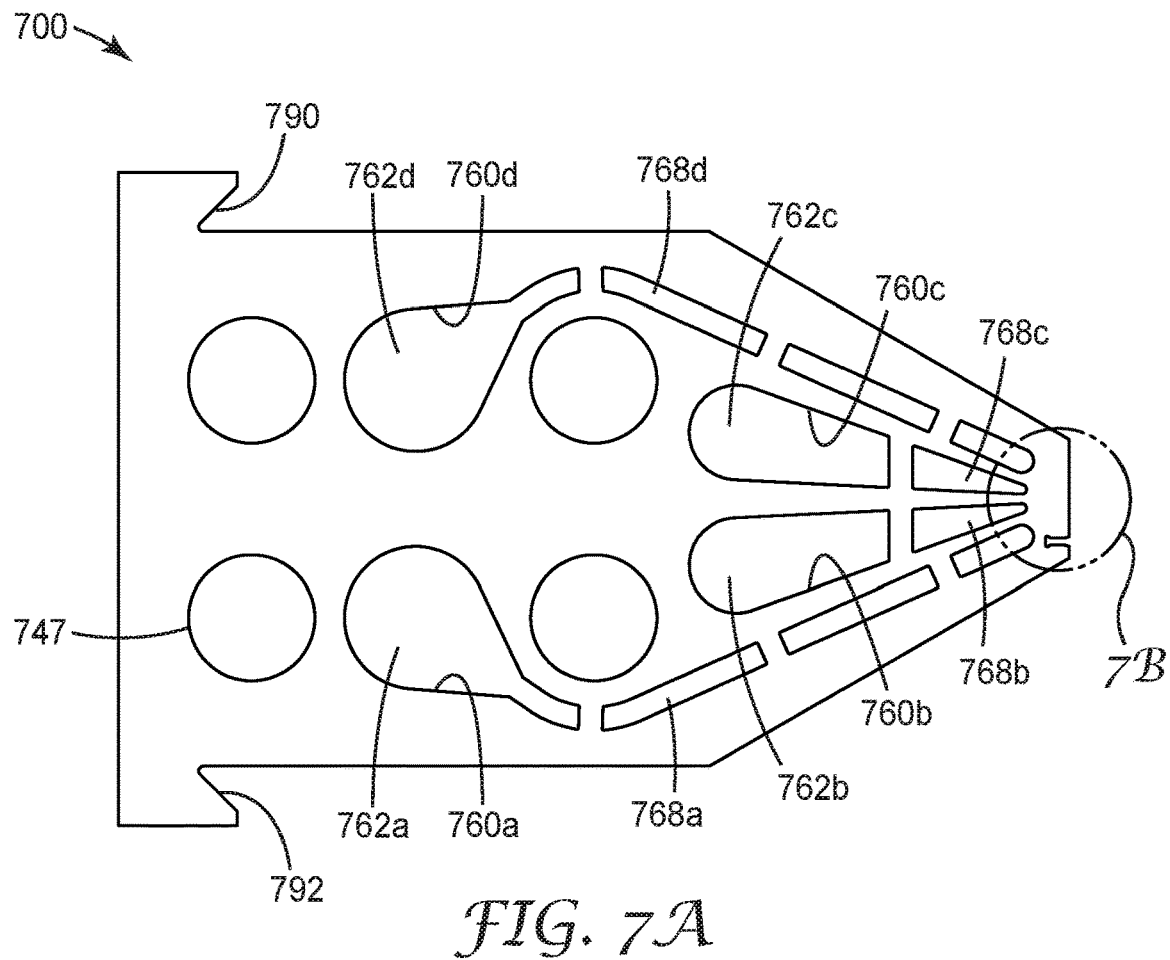
FIG. 7A is a plan view of an exemplary embodiment of a shim suited to form a sequence of shims capable of forming a coextruded polymeric article, for example, as shown in the schematic cross-sectional views of FIGS. 1 and 2.
Figure 7B:
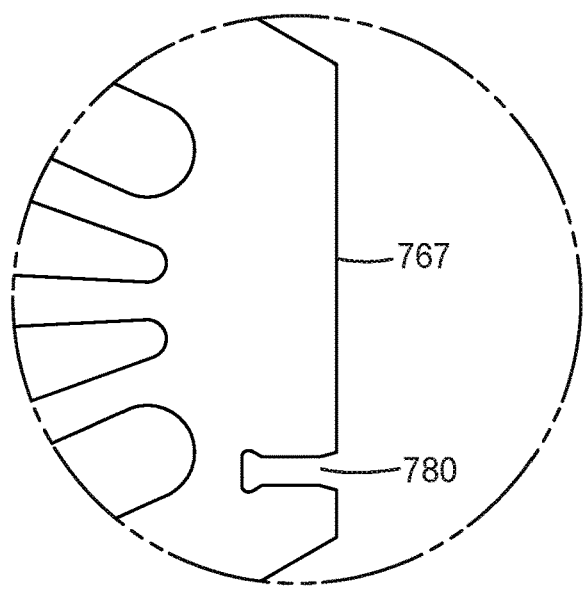
FIG. 7B is an expanded region near the dispensing surface of the shim shown in FIG. 7A.

Referring now to FIGS. 7A and 7B, shim 700 is illustrated. Shim 700 has first aperture 760a, second aperture 760b, third aperture 760c and fourth aperture 762d. When shim 700 is assembled with others as shown in FIGS. 9 and 10, aperture 760a will help define first cavity 762a, aperture 760b will help define second cavity 762b, aperture 760c will help define third cavity 762c and aperture 760d will help define fourth aperture 762d. Shim 700 has passageways 768a, 768b, 768c, and 768d cooperate with analogous passageways on adjacent shims to allow passage from cavities 762a, 762b, 762c, and 762d to the dispensing surfaces of the appropriate shims when the shims are assembled as shown in FIGS. 9 and 10. Analogous to shim 400, shim 700 has dispensing surface 767, and in this particular embodiment, dispensing surface 767 has indexing groove 780, and shoulders 790 and 792. Shim 700 does not have a dispensing orifice, it helps to create spacing between orifices, and thus has no connection between surface 767 any of the cavities 762a, 762b, 762c or 762d. Dispensing surface 767 may be more clearly seen in the expanded view shown in FIG. 7B.

Figure 8A:
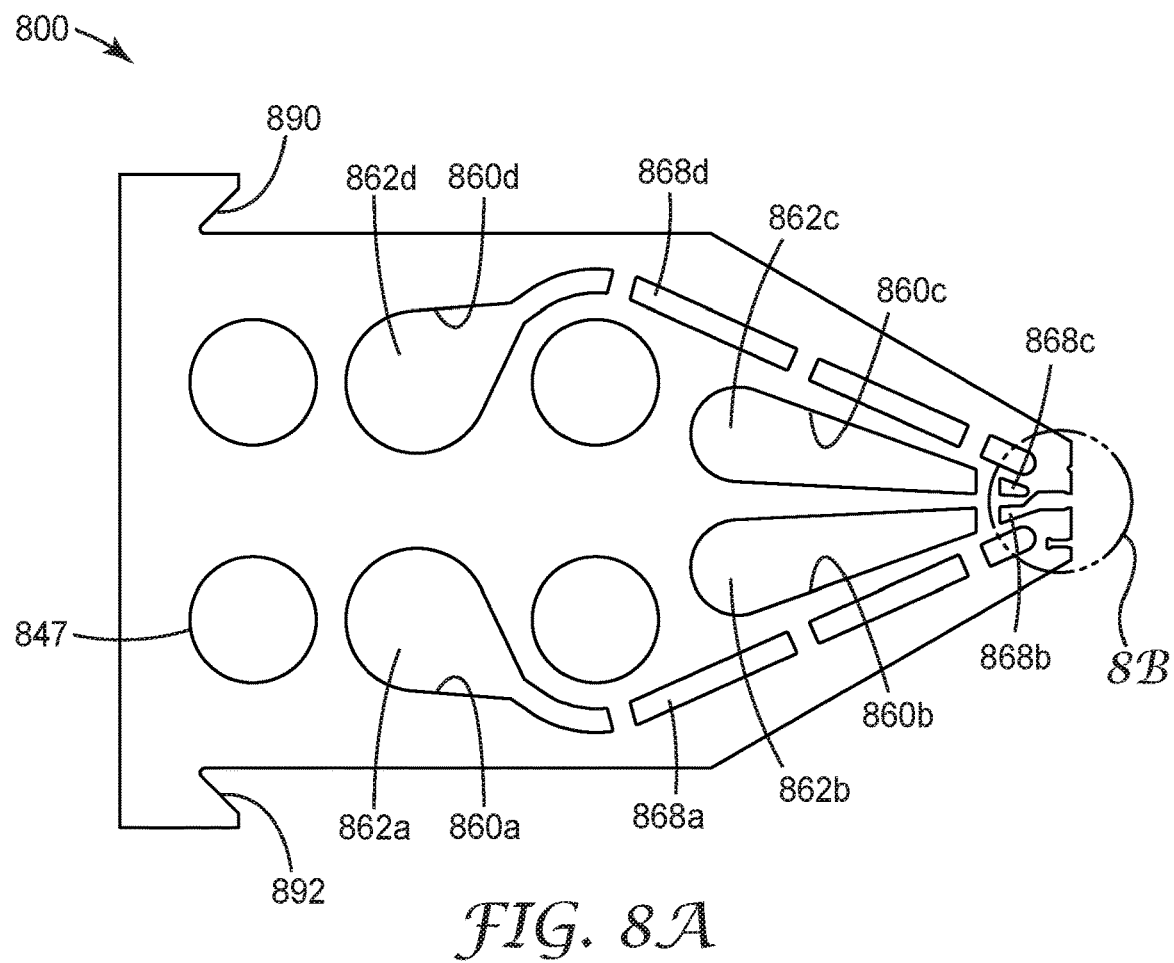
FIG. 8A is a plan view of an exemplary embodiment of a shim suited to form a sequence of shims capable of forming a coextruded polymeric article, for example, as shown in the schematic cross-sectional views of FIGS. 1 and 2.
Figure 8B:
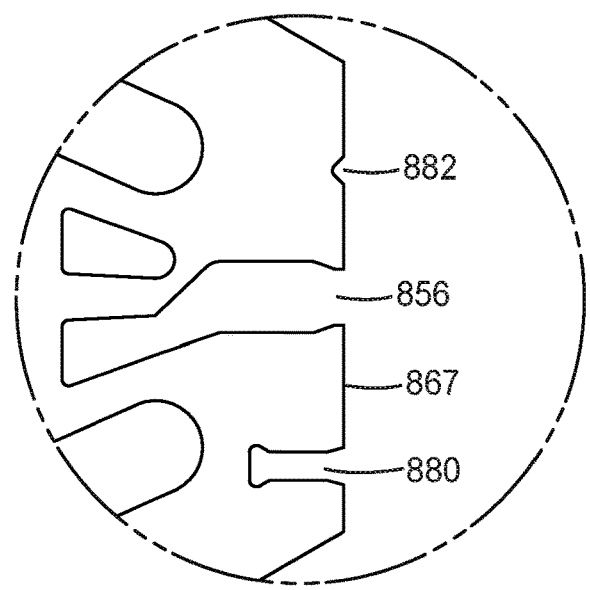
FIG. 8B is an expanded region near the dispensing surface of the shim shown in FIG. 8A.

Referring now to FIGS. 8A and 8B, shim 800 is illustrated. Shim 800 has first aperture, 860a, second aperture 860b, third aperture 860c and fourth aperture 860d. When shim 800 is assembled with others as shown in FIGS. 9 and 10, aperture 860a will help define first cavity 862a, aperture 860b will help define second cavity 862b, aperture 860c will help define third cavity 862c and aperture 862d will help define fourth cavity 862d. Shim 800 has passageways 868a, 868b, 868c, and 868d cooperate with analogous passageways on adjacent shims to allow passage from cavities 862a, 682b, 862c, and 862d to the dispensing surfaces of the appropriate shims when the shims are assembled as shown in FIGS. 9 and 10. Analogous to shim 400, shim 800 has dispensing surface 867, and in this particular embodiment, dispensing surface 867 has indexing groove 880, identification notch 882, and shoulders 890 and 892. Dispensing surface 867 may be more clearly seen in the expanded view shown in FIG. 8B. Shim 800 orifice 856 has connection to cavity 862b via passageway 868b. Orifice 856 helps form orifice 317 shown in FIG. 3.

FIG. 9 is an exploded perspective assembly illustration of an exemplary repeating sequence employing shims 400, 500, 600, 700, and 800, assembled in a sequence to form articles shown in FIGS. 1 and 2. FIG. 10 is a detail perspective view of the exemplary dispensing surface associated with the repeating sequence of FIG. 9.

Figure 11:
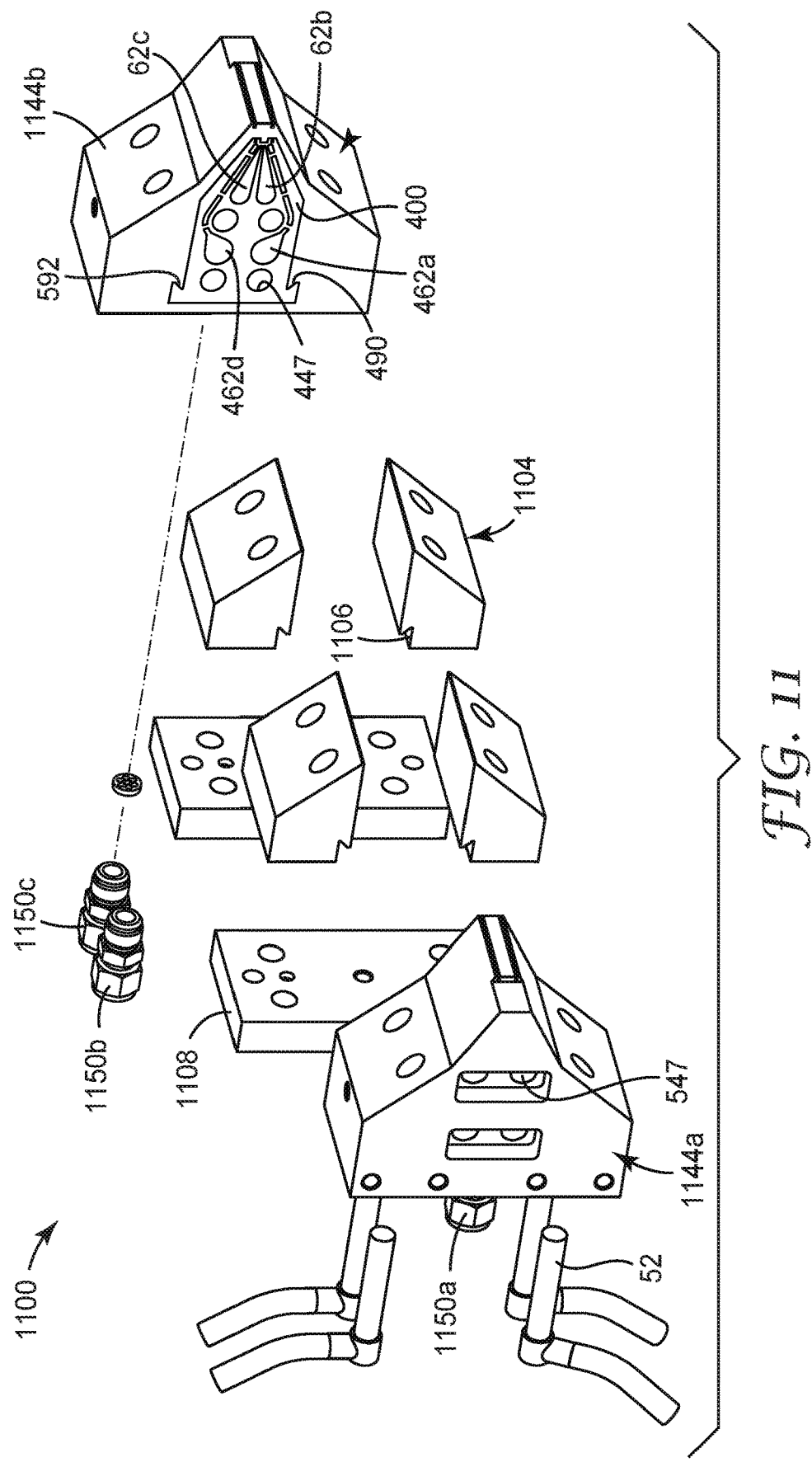
FIG. 11 is an exploded perspective view of an example of a mount suitable for an extrusion die composed of multiple repeats of the sequence of shims of FIG. 9.

Referring now to FIG. 11, an exploded perspective view of a mount 1100 suitable for an extrusion die composed of multiple repeats of the repeating sequence of shims of FIGS. 9 and 10 is illustrated. Mount 1100 is particularly adapted to use shims 400, 500, 600, 700 and 800 as shown in FIGS. 4A, 5A, 6A, 7A, and 8A. However, for visual clarity, only a single instance of shim 400 is shown in FIG. 11. The multiple repeats of the repeating sequence of shims of FIGS. 9 and 10 are compressed between two end blocks 1144a and 1144b. Conveniently, through bolts can be used to assemble the shims to the end blocks 1144a and 1144b, passing through holes 447 in shims 400 et al.

In this embodiment, inlet fittings 1150a and 1150b, and 1150c, (the fourth fitting is not shown), provide a flow path for three streams of molten polymer through end blocks 1144a and 1144b to cavities 462a, 462b, 462c and 462d. Compression blocks 1104 have a notch 1106 that conveniently engages the shoulders on the shims (e.g., 490 and 492 on 400). When mount 1100 is completely assembled, compression blocks 1104 are attached by, for example, machine bolts, to backplates 1108. Holes are conveniently provided in the assembly for the insertion of cartridge heaters 52.

Figure 12:
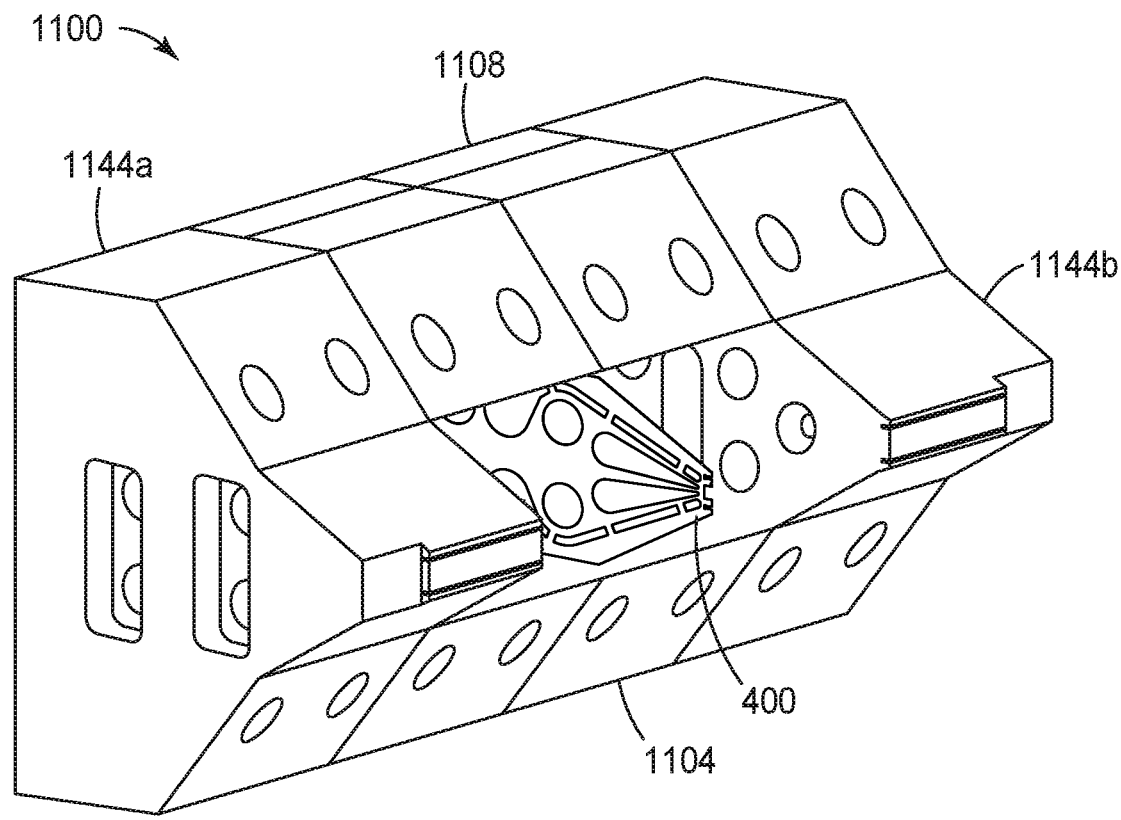
FIG. 12 is a perspective view of the mount of FIG. 11 in an assembled state.

Referring now to FIG. 12, a perspective view of mount 1100 of FIG. 9 is illustrated in a partially assembled state. A shim (e.g., 400) is shown in the assembled position to show how they fit within mount 1100, but most of the shims that would make up an assembled die have been omitted for visual clarity.

The size (same or different) of the strands can be adjusted, for example, by the composition of the extruded polymers, velocity of the extruded strands, and/or the orifice design (e.g., cross sectional area (e.g., height and/or width of the orifices)). For example, a first polymer orifice that is 3 times greater in area than the second polymer orifice can generate a netting with equal strand sizes while meeting the velocity difference between adjacent strands.

In general, it has been observed that the rate of strand bonding is proportional to the extrusion speed of the faster strand. Further, it has been observed that this bonding rate can be increased, for example, by increasing the polymer flow rate for a given orifice size, or by decreasing the orifice area for a given polymer flow rate. It has also been observed that the distance between bonds (i.e., strand pitch) is inversely proportional to the rate of strand bonding, and proportional to the speed that the netting is drawn away from the die. Thus, it is believed that the bond pitch and the netting basis weight can be independently controlled by design of the orifice cross sectional area, the takeaway speed, and the extrusion rate of the polymer. For example, relatively high basis weight nettings, with a relatively short bond pitch can be made by extruding at a relatively high polymer flow rate, with a relatively low netting takeaway speed, using a die with a relatively small strand orifice area.

Typically, the polymeric strands are extruded in the direction of gravity. This enables collinear strands to collide with each other before becoming out of alignment with each other. In some embodiments, it is desirable to extrude the strands horizontally, especially when the extrusion orifices of the first and second polymer are not collinear with each other.

In practicing methods described herein, the polymeric materials might be solidified simply by cooling. This can be conveniently accomplished passively by ambient air, or actively by, for example, quenching the extruded first and second polymeric materials on a chilled surface (e.g., a chilled roll). In some embodiments, the first and/or second polymeric materials are low molecular weight polymers that need to be cross-linked to be solidified, which can be done, for example, by electromagnetic or particle radiation. In some embodiments, it is desirable to maximize the time to quenching to increase the bond strength.

Optionally, it may be desirable to stretch the as-made netting. Stretching may orientate the strands and has been observed to increase the tensile strength properties of the netting. Stretching may also reduce the overall strand size, which may be desirable for applications which benefit from a relatively low basis weight. As an additional example, if the materials and the degree of stretch, are chosen correctly, the stretch can cause some of the strands to yield while others do not, tending to form loft (e.g., the loft may be created because of the length difference between adjacent bonded netting strands or by curling of the bonds due to the yield properties of the strands forming the bond). The attribute can be useful for packaging applications where the material can be shipped to package assembly in a relatively dense form, and then lofted, on location.

Portions of the exteriors of the first and second strands bond together at the bond regions. In methods described herein for making nettings described herein, the bonding occurs in a relatively short period of time (typically less than 1 second). The bonds are formed from continuous molten strands as they exit the die. The bonds are formed, parallel to each other and parallel to the machine direction of the netting. The bond regions, as well as the strands typically cool through air and natural convection and/or radiation. In selecting polymers for the strands, in some embodiments, it may be desirable to select polymers of bonding strands that have dipole interactions (or H-bonds) or covalent bonds. Bonding between strands has been observed to be improved by increasing the time that the strands are molten to enable more interaction between polymers. Bonding of polymers has generally been observed to be improved by reducing the molecular weight of at least one polymer and or introducing an additional co-monomer to improve polymer interaction and/or reduce the rate or amount of crystallization. In some embodiments, the bond strength is greater than the strength of the strands forming the bond. In some embodiments, it may be desirable for the bonds to break and thus the bonds will be weaker than the strands.

Suitable polymeric materials for extrusion from dies described herein, methods described herein, and for composite layers described herein include thermoplastic resins comprising polyolefins (e.g., polypropylene and polyethylene), polyvinyl chloride, polystyrene, nylons, polyesters (e.g., polyethylene terephthalate) and copolymers and blends thereof. Suitable polymeric materials for extrusion from dies described herein, methods described herein, and for composite layers described herein also include elastomeric materials (e.g., ABA block copolymers, polyurethanes, polyolefin elastomers, polyurethane elastomers, metallocene polyolefin elastomers, polyamide elastomers, ethylene vinyl acetate elastomers, and polyester elastomers). Exemplary adhesives for extrusion from dies described herein, methods described herein, and for composite layers described herein include acrylate copolymer pressure sensitive adhesives, rubber based adhesives (e.g., those based on natural rubber, polyisobutylene, polybutadiene, butyl rubbers, styrene block copolymer rubbers, etc.), adhesives based on silicone polyureas or silicone polyoxamides, polyurethane type adhesives, and poly(vinyl ethyl ether), and copolymers or blends of these. Other desirable materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefins, polyimides, mixtures and/or combinations thereof. Exemplary release materials for extrusion from dies described herein, methods described herein, and for composite layers described herein include silicone-grafted polyolefins such as those described in U.S. Pat. No. 6,465,107 (Kelly) and U.S. Pat. No. 3,471,588 (Kanner et al.), silicone block copolymers such as those described in PCT Pub. No. WO96039349, published Dec. 12, 1996, and low density polyolefin materials such as those described in U.S. Pat. No. 6,228,449 (Meyer), U.S. Pat. No. 6,348,249 (Meyer), and U.S. Pat. No. 5,948,517 (Meyer), the disclosures of which are incorporated herein by reference.

In some embodiments, the first and second polymers are independently a thermoplastic (e.g., adhesives, nylons, polyesters, polyolefins, polyurethanes, elastomers (e.g., styrenic block copolymers), and blends thereof).

In some embodiments, the plurality of strands includes alternating first and second polymeric strands.

In some embodiments, it may be desirable for the sheathed core to comprise a fluid (e.g., at least one of gas (e.g., air), liquid (e.g., water, ethylene glycol, or mineral oil), or viscous fluid (e.g., thermal grease)) in the core may be desirable, for example, for thermal transport in thermal interface articles used to control the temperature of and/or dissipate heat for electronic components and batteries or mechanical devices. Exemplary gasses include air and inert gases. Exemplary liquids include water and ethylene glycol and mineral oils. In some embodiments, it may be desirable for the sheathed core to comprise an endothermic material (e.g., wax) in the core which absorbs heat when it melts and releases heat when it solidifies. Such embodiments may be useful, for example, for electronic components and batteries or mechanical devices. It is typically necessary to add a filler material as the netting is extruded to prevent collapse of the hollow strand. It may be desired to first fill the hollow strand with air with subsequent replacement with a suitable filler material. This can be injected after the netting has quenched. In some embodiments the liquid may be used to transport thermal energy through the hollow strand in the machine direction of the hollow strand. In some embodiments, the liquid may be used to transport thermal energy across the thickness direction of the hollow strand from a first face to a second face of the netting. In this way the core material provides thermal transport with flexibility to conform to irregular shapes. In this case, higher viscosity materials may be used such as thermal greases.

In some embodiments, the first polymeric stands and the second polymeric stands are both formed with a hollow core arrangement. In particular, the first polymeric strands may have a sheath of polymeric material different than the second polymeric strands. The die design for this scenario will necessarily has at least four cavities.

In some embodiments, polymeric materials used to make nettings described herein may comprise a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for one or more of the polymeric materials. The amount of colorant(s) to be used in specific embodiments can be readily determined by those skilled in the (e.g., to achieve desired color, tone, opacity, transmissivity, etc.). If desired, the polymeric materials may be formulated to have the same or different colors. When colored strands are of a relatively fine (e.g., less than 50 micrometers) diameter, the appearance of the web may have a shimmer reminiscent of silk.

Strands made using methods described herein do not substantially cross over each other (i.e., at least 50 (at least 55, 60, 65, 70, 75, 80, 85, 90, 95, 99, or even 100) percent by number).

In some embodiments, the strands are within the same plane.

In some embodiments, nettings described herein have a thickness up to 5000 (in some embodiments, up to 2000, 1000, 500, 100, 50, or even up to 25; in a range from 10 to 5000, 10 to 2000, 10 to 1000, 10 to 500, 10 to 100, 10 to 50, or even 10 to 25) micrometers.

In some embodiments, the polymeric strands have an average width in a range from 10 to 500 (in a range from 10 to 400, or even 10 to 250) micrometers. In some embodiments, the first polymeric strands have an average width in a range from 10 to 500 (in a range from 10 to 400, or even 10 to 250) micrometers; and the second strands have an average width in a range from 10 to 500 (in a range from 10 to 400, or even 10 to 250) micrometers.

In some embodiments, nettings described herein have a basis weight in a range from 5 to 1000 (in some embodiments, in a range from 10 to 400) g/m², for example, nettings as-made from dies described herein. In some embodiments, nettings described herein after being stretched have a basis weight in a range from 0.5 to 40 (in some embodiments, in a range from 1 to 20) g/m2.

In some embodiments, nettings described herein have a strand pitch in the machine direction, in a range from 0.5 to 20 (in some embodiments, in a range from 0.5 to 10) mm.

In some embodiments, at least some of the cores have at least two (in some embodiments at least three) sheaths thereon.

In some embodiments, at least 25 (in some embodiments, at least 30, 35, 40, 45, 50, 55, 60, 65, 70, 75, 80, 85, 90, 95, or even 100) percent by number hollow polymeric strands each have a hollow cross-sectional area in a range from 0.2 to 1 (in some embodiments, in a range from 0.1 to 2, or even 0.1 to 5) mm².

In some embodiments, the polymer comprises a filler material (e.g., aluminum oxide, aluminum nitride, aluminum trihydrate, boron nitride, aluminum, copper, graphite, graphene, magnesium oxide, zinc oxide) to provide thermal conductivity.

In some embodiments, the array of polymeric strands exhibits at least one of diamond-shaped or hexagonal-shaped openings.

In some embodiments, at least some of spaces between strands of netting described herein are filled with thermally conductive material (i.e., materials having a thermal conductivity of at least 0.5 watts per meter kelvin). Exemplary thermally conductive materials include functional particles of (e.g., aluminum oxide, aluminum nitride, aluminum trihydrate, boron nitride, aluminum, copper, graphite, graphene, magnesium oxide, zinc oxide) to provide desired thermal properties to articles described herein. In some embodiments, it may be desirable for the area surrounding and within the netting to comprise a viscous fluid (e.g., at least one of liquid or solid (e.g., thermal grease)) within the netting. In some embodiments, it may be desirable for the area surrounding and within the netting to comprise an endothermic material (e.g., wax) in the core which absorbs heat when it melts and releases heat when it solidifies. Such embodiments may be useful, for example, for electronic components and batteries or mechanical devices. Such materials provided into the void space of the netting by smearing and doctoring the coatings into the void spaces.

Optionally, nettings described herein are attached to a backing. The backings may be, for example, one of a film, net, or non-woven. Films may be particularly desirable, for example, for applications utilizing clear printing or graphics. Nonwovens or nets may be particularly desirable, for example, where a softness and quietness that films typically do not have is desired. The netting may be stretched and bonded between at least two layers of film or nonwoven where the bond points have a plurality (at least two) of bond points that do not include the netting in the bond. Alternatively, an unstretched netting could be bonded between at least two layers of film or nonwoven where the bond points have a plurality (at least two) of bond points that do not include the netting in the bond. These constructions may require subsequent stretching, either localized ("ring rolling") or global, to become an activated elastic laminate.

In some embodiments, nettings described herein are elastic. In some embodiments, the polymeric strands have a machine direction and a cross-machine direction, wherein the netting or arrays of polymeric strands is elastic in machine direction, and inelastic in the cross-machine direction. Elastic means that the material will substantially resume its original shape after being stretched (i.e., will sustain only small permanent set following deformation and relaxation which set is less than 50 percent (in some embodiments, less than 25, 20, or even less than 10 percent) of the original length at moderate elongation (i.e., in a range from about 400 to 500; in some embodiments, in a range from 300 to 1200, or even 600 to 800) percent elongation at room temperature). The elastic material can be both pure elastomers and blends with an elastomeric phase or content that will still exhibit substantial elastomeric properties at room temperature.

It is within the scope of the instant disclosure to use heat-shrinkable and non-heat shrinkable elastics. Non-heat shrinkable means that the elastomer, when stretched, will substantially recover sustaining only a small permanent set as discussed above at room temperature (i.e., about 25° C.).

In some embodiments, nettings described herein of alternating first and second polymeric strands exhibit at least one of diamond-shaped or hexagonal-shaped openings.

In some embodiments, a hollow strand alternates with a solid strand. The solid strand may be designed to provide uniform spacing of hollow strands. In some embodiments, a solid strand may be relatively small (e.g., 0.05 mm to 0.2 mm) or large (e.g., 0.2 mm to 2 mm) in diameter, and may have relatively short (e.g., 0.1 mm to 1 mm) or long (e.g., 1 mm to 10 mm) distances between bonds to facilitate desired spacing of hollow strands.

In some embodiments, the strands (i.e., the first strands and second strands), bond regions, and other optional strands, each have thicknesses that are substantially the same.

In some embodiments, the bond regions have an average largest dimension perpendicular to the strand thickness, and wherein the average largest dimension of the bond regions is at least 2 (in some embodiments, at least 3, 4, 5, 10, or even at least 15) times greater than the average width of at least one of the first strands or the second strands.

Some embodiments of nettings described herein where the sheathed core of fluid (e.g., at least one of gas (e.g., air) or liquid (e.g., water, ethylene glycol, or mineral oil)) are useful, for example, for as padding and spacer materials (e.g., for personal padding and packaging applications).

In some embodiments, nettings described having a backing thereon on a major surface thereof, providing an article. In some embodiments, the backing is one of a film, net, or non-woven. In some embodiments, the article includes bond lines. In some embodiments, the article comprising the netting is disposed between two non-woven layers. In some embodiments, the article comprising two nettings with a ribbon region disposed there between. In some embodiments, the netting and ribbon region are integral.

Additional information that may be useful in making and using nettings described therein, when combined with the instant disclosure, can be found in U.S. Pat. Pub. No. 2014/0220328 A1 (Ausen et al.), the disclosure of which is incorporated herein by reference.

EXEMPLARY EMBODIMENTS

1A. A netting comprising an array of (typically adjacent) polymeric strands, wherein the polymeric strands are periodically joined together at bond regions throughout the array with spaces between adjacent strands (i.e., between bond regions the bonded strands for each respective bond region are separated), wherein at least a plurality (i.e., at least two) of the strands are hollow polymeric strands (i.e., a hollow core with a sheath surrounding the hollow core), and wherein the strands do not substantially cross over each other (i.e., at least 50 (at least 55, 60, 65, 70, 75, 80, 85, 90, 95, 99, or even 100) percent by number do not cross over each other).

2A. The netting of Exemplary Embodiment 1A, wherein the strands are within the same plane.

3A. The netting of either Exemplary Embodiment 1A or 2A, wherein the netting has a thickness up to 5000 (in some embodiments, up to 2000, 1000, 500, 100, 50, or even up to 25; in a range from 10 to 5000, 10 to 2000, 10 to 1000, 10 to 500, 10 to 100, 10 to 50, or even 10 to 25) micrometers.

4A. The netting of any preceding A Exemplary Embodiment that is an extruded netting.

5A. The netting of any preceding A Exemplary Embodiment, wherein at least some of the cores have at least two (in some embodiments, at least three) sheaths thereon.

6A. The netting of any preceding A Exemplary Embodiment having a basis weight in a range from 5 to 1000 (in some embodiments, 10 to 400) g/m2.

7A. The netting of any preceding A Exemplary Embodiment having a strand pitch in a range from 0.5 to 20 (in some embodiments, in a range from 0.5 to 10) mm.

8A. The netting of any preceding A Exemplary Embodiment, wherein at least 25 (in some embodiments, at least 30, 35, 40, 45, 50, 55, 60, 65, 70, 75, 80, 85, 90, 95, or even 100) percent by number hollow polymeric strands each have a hollow cross-sectional area in a range from 0.2 to 1 (in some embodiments, in a range from 0.1 to 2, or even 0.1 to 5) mm$^2$.

9A. The netting of any preceding A Exemplary Embodiment, wherein the polymer comprises a filler to provide thermal conductivity.

10A. The netting of any of Exemplary Embodiments 1A to 8A that is elastic.

11A. The netting of any of Exemplary Embodiments 1A to 8A having a machine direction and a cross-machine direction, wherein the netting is elastic in machine direction, and inelastic in the cross-machine direction.

12A. The nettings of any preceding A Exemplary Embodiment where the netting is stretched.

13A. The netting of any preceding A Exemplary Embodiment, wherein at least one of the first or second polymeric material comprises at least one of a dye or pigment.

14A. The netting of any preceding A Exemplary Embodiment, wherein the array of polymeric strands exhibits at least one of diamond-shaped or hexagonal-shaped openings.

15A. The netting of any preceding A Exemplary Embodiment, wherein the first and second polymers are independently a thermoplastic (e.g., adhesives, nylons, polyesters, polyolefins, polyurethanes, elastomers (e.g., styrenic block copolymers), and blends thereof).

16A. The netting of any preceding A Exemplary Embodiment, wherein the polymeric strands have an average width in a range from 10 to 500 (in some embodiments, in a range from 10 to 400, or even 10 to 250) micrometers.

17A. The netting of any preceding A Exemplary Embodiment, wherein the plurality of strands include alternating first and second polymeric strands.

18A. The netting of Exemplary Embodiment 17A, wherein the second strands have an average width in a range from 10 to 500 (in some embodiments, in a range from 10 to 400, or even 10 to 250) micrometers.

19A. An article comprising netting of any preceding A Exemplary Embodiment, and further comprising thermally conductive material filling at least some of spaces between strands.

20A. The article of Exemplary Embodiment 19A, wherein the thermally conductive material comprises at least one of functional particles of (e.g., aluminum oxide, aluminum nitride, aluminum trihydrate, boron nitride, aluminum, copper, graphite, graphene, magnesium oxide, zinc oxide).

21A. An article comprising netting of any preceding A Exemplary Embodiment, and further comprising an endothermic material (e.g., wax) filling at least some of spaces between strands.

22A. An article comprising a backing having the netting of any preceding A Exemplary Embodiment on a major surface thereof 23A. The article of Exemplary Embodiment 22A, wherein the backing is one of a film, net, or non-woven.

24A. The article of Exemplary Embodiment 23A that includes bond lines.

25A. An article comprising the netting of any of Exemplary Embodiments 1A to 18A disposed between two non-woven layers.

26A. An article comprising two nettings of any of Exemplary Embodiments 1A to 18A with a ribbon region disposed there between.

27A. The article of Exemplary Embodiment 25A, wherein the netting and ribbon region are integral.

28A. The article of any of Exemplary Embodiments 19A to 26A that is a thermal control article (e.g., for electronic devices or batteries).

1B. A method of making the netting of any of Embodiments 1A to 19A, the method comprising:
providing an extrusion die comprising a plurality of shims positioned adjacent to one another, the shims together defining at least a first cavity, a second cavity, and a third cavity, and a dispensing surface, wherein the dispensing surface has an array of alternating dispensing orifices, wherein the plurality of shims comprises a plurality of a repeating sequence of shims, wherein the repeating sequence comprises: shims that provide a fluid passageway between the first cavity and a first plurality of orifices, shims that provide a second passageway extending from the second cavity to a second plurality of enclosed polygon shaped orifices, and also that provide a third passageway extending from a third cavity to a third plurality of orifices located within the enclosed polygon orifice area; and dispensing first polymeric strands from the first dispensing orifices at a first strand speed while simultaneously dispensing second polymeric strands from the second dispensing orifices at a second strand speed, wherein the first strand speed is at least 2 (in some embodiments, in a range from 2 to 6, or even 2 to 4) times the second strand speed to provide the netting.

2B. The method of Exemplary Embodiment 1B, wherein the third passageway is filled with gas (e.g., air).

3B. The method of Exemplary Embodiment 1B further comprising dispensing filler material (e.g., a liquid) from the third dispensing orifices.

1C. A netting comprising an array of (typically adjacent) polymeric strands, wherein the polymeric strands are periodically joined together at bond regions throughout the array, wherein at least a plurality (i.e., at least two) of the strands each have a core, wherein at least some cores comprise (in some embodiments, each core) comprise (in some embodiments, consisting essentially of) at least one of an endothermic material (e.g., wax) or fluid (e.g., at least one of gas (e.g., air) or liquid (e.g., water, ethylene glycol, or mineral oil)) (i.e., a sheath surrounding the core), and wherein the strands do not substantially cross over each other (i.e., at least 50 (at least 55, 60, 65, 70, 75, 80, 85, 90, 95, 99, or even 100) percent by number do not cross over each other).

2C. The netting of Exemplary Embodiment 1C, wherein the strands are within the same plane.

3C. The netting of either Exemplary Embodiment 1C or 2C, wherein the netting has a thickness up to 5000 (in some embodiments, up to 2000, 1000, 500, 100, 50, or even up to 25; in a range from 10 to 5000, 10 to 2000, 10 to 1000, 10 to 500, 10 to 100, 10 to 50, or even 10 to 25) micrometers.

4C. The netting of any preceding C Exemplary Embodiment that is an extruded netting.

5C. The netting of any preceding C Exemplary Embodiment, wherein at least some of the cores have at least two (in some embodiments, at least three) sheaths thereon.

6C. The netting of any preceding C Exemplary Embodiment having a basis weight in a range from 5 to 1000 (in some embodiments, 10 to 400) g/m2.

7C. The netting of any preceding C Exemplary Embodiment having a strand pitch in a range from 0.5 to 20 (in some embodiments, in a range from 0.5 to 10) mm.

8C. The netting of any preceding C Exemplary Embodiment, wherein at least 25 (in some 25 embodiments, at least 30, 35, 40, 45, 50, 55, 60, 65, 70, 75, 80, 85, 90, 95, or even 100) percent by number hollow polymeric strands have a hollow cross-sectional area in a range from 0.2 to 1 (in some embodiments, in a range from 0.1 to 2, or even 0.1 to 5) mm$^2$.

9C. The netting of any preceding C Exemplary Embodiment, wherein the polymer comprises a filler to provide thermal conductivity.

10C. The netting of any of Exemplary Embodiments 1C to 8C that is elastic.

11C. The netting of any of Exemplary Embodiments 1C to 8C having a machine direction and a cross-machine direction, wherein the netting is elastic in machine direction, and inelastic in the cross-machine direction.

12C. The nettings of any preceding C Exemplary Embodiment where the netting is stretched.

13C. The netting of any preceding C Exemplary Embodiment, wherein at least one of the first or second polymeric material comprises at least one of a dye or pigment.

14C. The netting of any preceding C Exemplary Embodiment, wherein the array of polymeric strands exhibits at least one of diamond-shaped or hexagonal-shaped openings.

15C. The netting of any preceding C Exemplary Embodiment, wherein the first and second polymers are independently a thermoplastic (e.g., adhesives, nylons, polyesters, polyolefins, polyurethanes, elastomers (e.g., styrenic block copolymers), and blends thereof).

16C. The netting of any preceding C Exemplary Embodiment, wherein the polymeric strands have an average width in a range from 10 to 500 (in some embodiments, in a range from 10 to 400, or even 10 to 250) micrometers).

17C. The netting of any preceding C Exemplary Embodiment, wherein the plurality of strands include alternating first and second polymeric strands.

18C. The netting of Exemplary Embodiment 17C, wherein the second strands have an average width in a range from 10 to 500 (in some embodiments, in a range from 10 to 400, or even 10 to 250) micrometers.

19C. An article comprising a backing having the netting of any preceding C Exemplary Embodiment on a major surface thereof 20C. The article of Exemplary Embodiment 19C, wherein the backing is one of a film, net, or non-woven.

21C. The article of any preceding C Exemplary Embodiment that includes bond lines.

22C. An article comprising the netting of any of Exemplary Embodiments 1C to 19C disposed between two non-woven layers.

23C. An article comprising two nettings of any of Exemplary Embodiments 1C to 19CA with a ribbon region disposed there between.

24C. The article of Exemplary Embodiment 23C, wherein the netting and ribbon region are integral.

25C. The article of nay preceding C Exemplary Embodiment that is a thermal control article (e.g., for electronic devices or batteries).

1D. A method of making the netting of any of Embodiments 1C to 19C, the method comprising:

providing an extrusion die comprising a plurality of shims positioned adjacent to one another, the shims together defining at least a first cavity, a second cavity, and a third cavity, and a dispensing surface, wherein the dispensing surface has an array of alternating dispensing orifices, wherein the plurality of shims comprises a plurality of a repeating sequence of shims, wherein the repeating sequence comprises: shims that provide a fluid passageway between the first cavity and a first plurality of orifices, shims that provide a second passageway extending from the second cavity to a second plurality of enclosed polygon shaped orifices, and also that provide a third passageway extending from a third cavity to a third plurality of orifices located within the enclosed polygon orifice area; and dispensing first polymeric strands from the first dispensing orifices at a first strand speed while simultaneously dispensing second polymeric strands from the second dispensing orifices at a second strand speed, and providing an open air passageway or filler material for the third cavity and the third dispensing orifices, wherein the first strand speed is at least 2 (in some embodiments, in a range from 2 to 6, or even 2 to 4) times the second strand speed to provide the netting.

2D. The method of Exemplary Embodiment 1D, wherein the third passageway is filled with gas (e.g., air).

3D. The method of Exemplary Embodiment 1D further comprising dispensing filler material (e.g., a liquid) from the third dispensing orifices.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Example 1

A co-extrusion die as generally shown in FIG. 12 and assembled with a multi shim repeating pattern of extrusion orifices as generally shown in FIGS. 9 and 10, was prepared. The thickness of the shims in the repeat sequence was 4 mils (0.102 mm). These shims were formed from stainless steel, with perforations cut by a wire electron discharge machining. The shims were stacked in a repeating sequence was 400, 400, 400, 400, 500, 500, 600, 600, 600, 600, 500, 500, 400, 400, 400, 400, 700, 700, 700, 700, 800, 800, 800, 700, 700, 700, 700. This configuration creates a repeating length of 108 mils (2.74 mm) with cavities, passageways and orifices such that the first extruder feeds the orifices for the tubular channel, and the second extruder feeds the orifices the connecting strand between tube channels. A third plurality of orifices created from a third set of passageways provides ambient air to the center of the tubular channel. The shims were assembled to create a die at approximately 6 cm in width. The extrusion orifices were aligned in a collinear, alternating arrangement, and resulting dispensing surface was as shown in FIG. 3.

The inlet fittings on the two end blocks were each connected to two conventional single-screw extruders. The extruders feeding the two cavities of the die were loaded with polyethylene (obtained under the trade designation "ELITE 5230" from Dow Chemical, Midland, MI) dry blended with 2% yellow color concentrate (obtained under the trade designation "PP23642905" from Clariant, Minneapolis, MN) for the tubular extruder, and 2% blue color concentrate (obtained under the trade designation "PP52643825" from Clariant) for the strand extruder.

Figure 13:
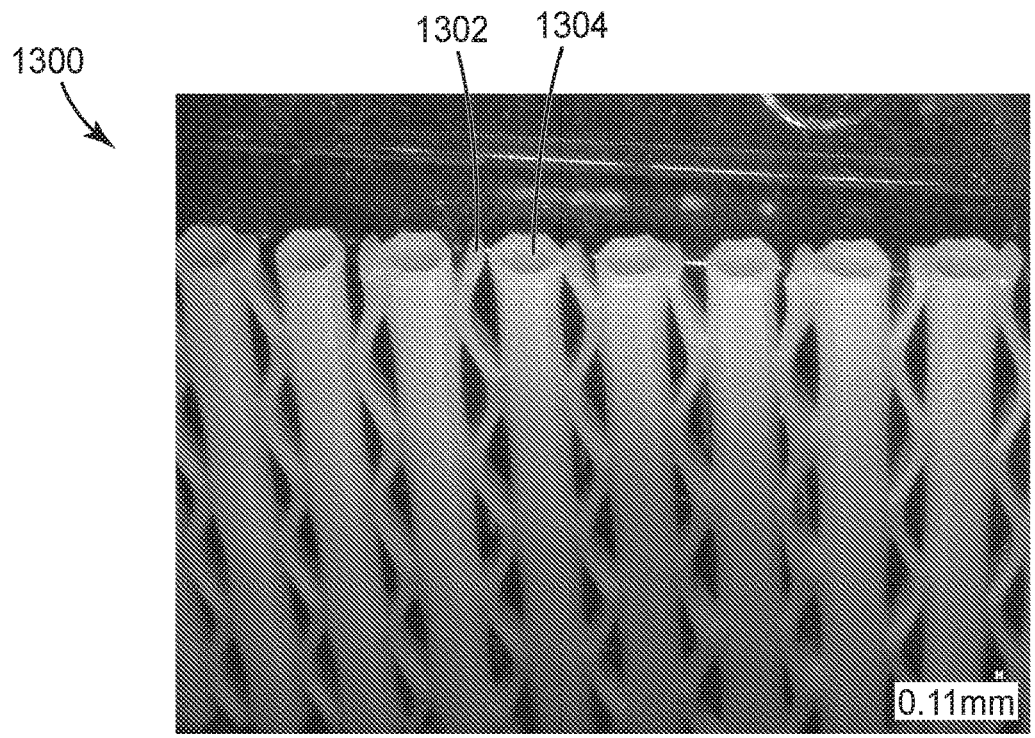
FIG. 13 is an optical image of Example 1.

The melt was extruded vertically into an extrusion quench takeaway. The quench roll was a smooth temperature-controlled chrome plated 20 cm diameter steel roll. The quench nip temperature was controlled with internal water flow. The web path wrapped 180 degrees around the chrome steel roll and then to a windup roll. Under these conditions a polymeric layer generally as shown in FIG. 13 was extruded.

Other process conditions are listed below:

| | |
|---|---|
| Flow rate for the tubular orifice | 1.6 kg/hr. |
| Flow rate for the strand orifices | 0.7 kg/hr. |
| Extrusion temperature | 204° C. |

-continued

| | |
|---|---|
| Quench roll temperature | 10° C. |
| Quench takeaway speed | 1.2 m/min. |
| Web basis weight | 660 g/m² |

An optical microscope was used to measure web dimensions:

| | |
|---|---|
| Connecting strand width: | 0.25 mm |
| Connecting strand height: | 1.1 mm |
| Total caliper: | 1.41 mm |
| Crossweb repeat length: | 2.3 mm |
| Hollow strand inside area: | 0.65 mm² |
| Machine direction bond repeat | 4.5 mm |
| Machine direction bond length | 1.9 mm |

A digital optical image of Example 1 netting 1300 is shown in FIG. 13. Netting 1300 includes first strands of solid material 1302 and second strands having a core/sheath arrangement 1304.

Example 2

Example 2 was prepared as described for Example 1 with the following exceptions.

The extruders feeding the two cavities of the die were loaded with polyether block amide (obtained under the trade designation "PEBAX 4033" from Arkema Chemical, Reading, PA).

Other process conditions are listed below:

| | |
|---|---|
| Flow rate for the tubular orifice | 2.2 kg/hr. |
| Flow rate for the strand orifices | 0.9 kg/hr. |
| Extrusion temperature | 204° C. |
| Quench roll temperature | 10° C. |
| Quench takeaway speed | 1.8 m/min. |
| Web basis weight | 620 g/m² |

An optical microscope was used to measure web dimensions:

| | |
|---|---|
| Connecting strand width: | 0.3 mm |
| Connecting strand height: | 0.9 mm |
| Total caliper: | 1.18 mm |
| Crossweb repeat length: | 2.2 mm |
| Hollow strand inside area: | 0.47 mm² |
| Machine direction bond repeat | 4.6 mm |
| Machine direction bond length | 2.2 mm |

Figure 14:
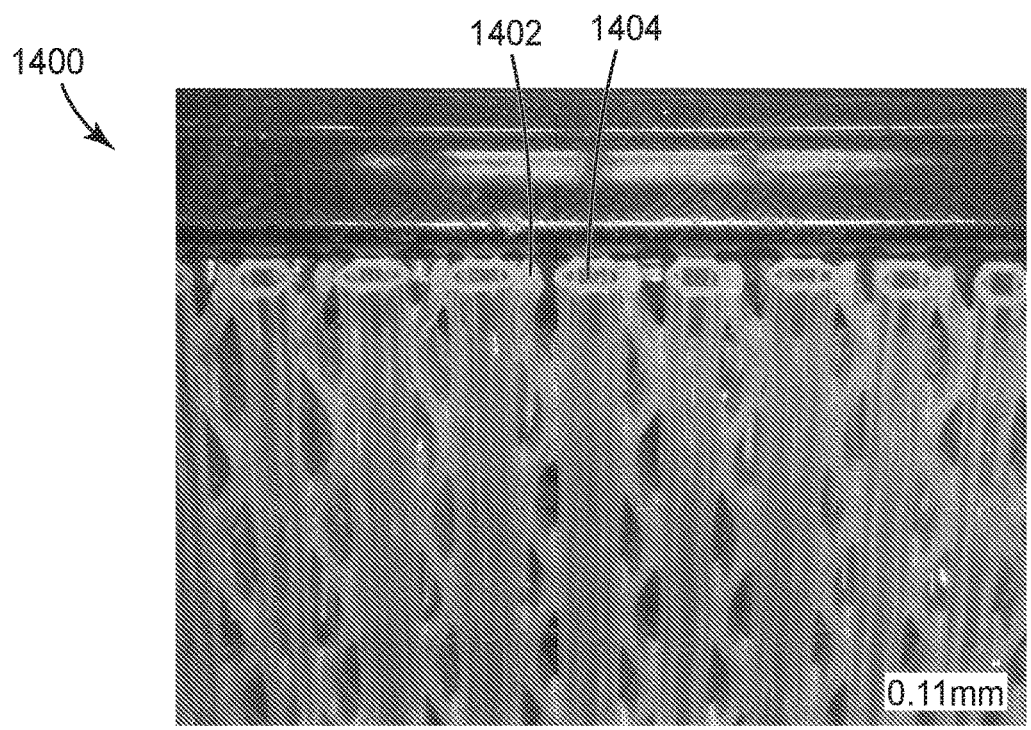
FIG. 14 is an optical image of Example 2.

A digital optical image of Example 2 netting 1400 is shown in FIG. 14. Netting 1400 includes first strands of solid material 1402 and second strands having a core/sheath arrangement 1404.

Example 3

Example 3 was made as described for Example 1 with the following exceptions.

The extruders feeding the two cavities of the die were loaded with polyether block amide (obtained under the trade designation "PEBAX 4033" from Arkema Chemical, Reading, PA).

Other process conditions are listed below:

| | |
|---|---|
| Flow rate for the tubular orifice | 2.2 kg/hr. |
| Flow rate for the strand orifices | 0.9 kg/hr. |
| Extrusion temperature | 204° C. |
| Quench roll temperature | 10° C. |
| Quench takeaway speed | 0.9 m/min. |
| Web basis weight | 620 g/m² |

An optical microscope was used to measure web dimensions:

| | |
|---|---|
| Connecting strand width: | 0.33 mm |
| Connecting strand height: | 1.4 mm |
| Total caliper: | 1.8 mm |
| Crossweb repeat length: | 2.4 mm |
| Hollow strand inside area: | 1.03 mm² |
| Machine direction bond repeat | 2.7 mm |
| Machine direction bond length | 1.4 mm |

Figure 15:
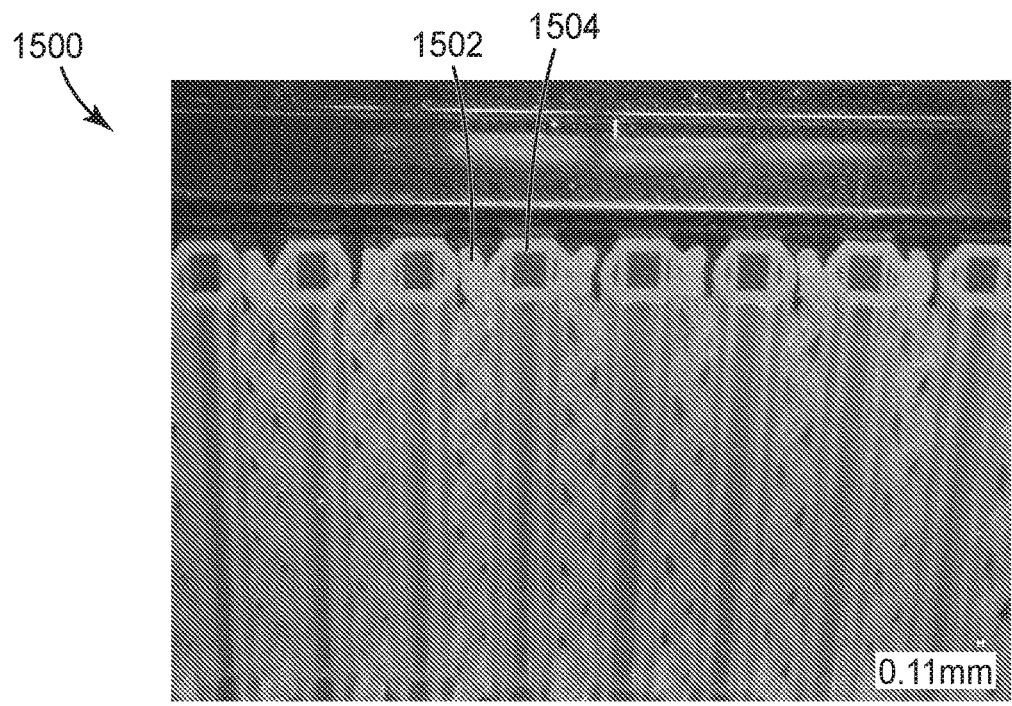
FIG. 15 is an optical image of Example 3.

A digital optical image of Example 3 netting 1500 is shown in FIG. 15. Netting 1500 includes first strands of solid material 1502 and second strands having a core/sheath arrangement 1504.

Example 4

Example 4 was made as described for Example 2 with the following exceptions. The shims were stacked in a repeating sequence was 400, 400, 400, 400, 500, 500, 600, 600, 600, 600, 500, 500, 400, 400, 400, 400, 700, 700, 700, 700, 700, 800, 800, 800, 700, 700, 700, 700, 700.

Other process conditions are listed below:

| | |
|---|---|
| Flow rate for the tubular orifice | 1.6 kg/hr. |
| Flow rate for the strand orifices | 0.7 kg/hr. |
| Extrusion temperature | 193° C. |
| Quench roll temperature | 10° C. |
| Quench takeaway speed | 3.05 m/min. |
| Web basis weight | 270 g/m² |

An optical microscope was used to measure web dimensions:

| | |
|---|---|
| Connecting strand width: | 0.2 mm |
| Connecting strand height: | 0.9 mm |
| Total caliper: | 1.25 mm |
| Crossweb repeat length: | 2.5 mm |
| Hollow strand inside area: | 1.05 mm² |
| Machine direction bond repeat | 8.5 mm |
| Machine direction bond length | 3.6 mm |

Figure 16:
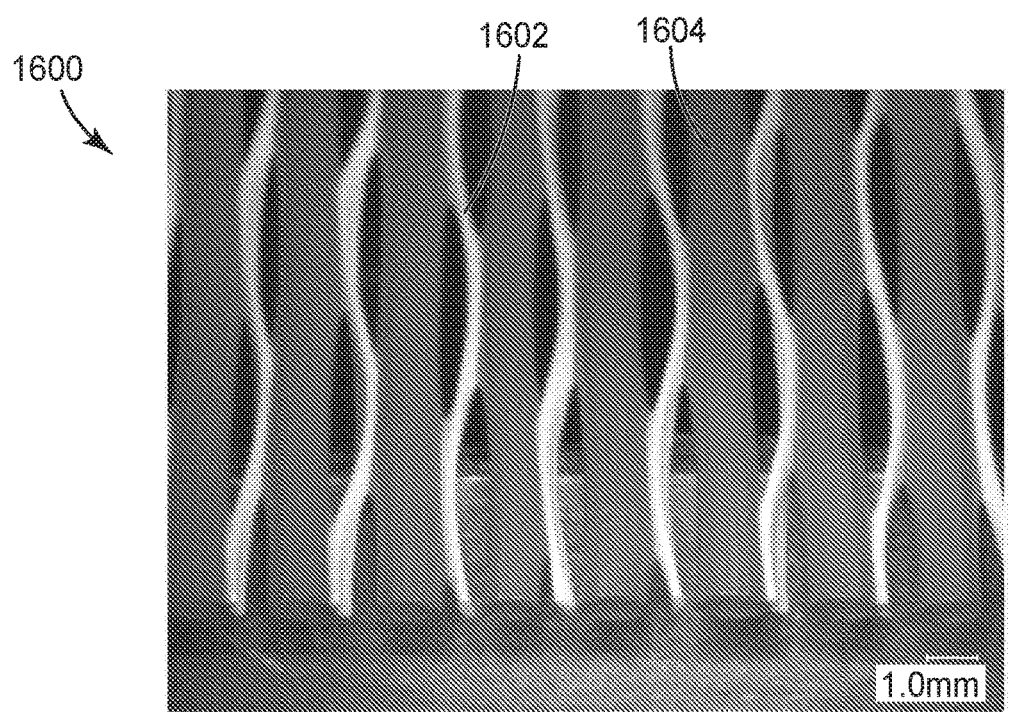
FIG. 16 is an optical image of Example 4.

A digital optical image of Example 4 netting 1600 is shown in FIG. 16. Netting 1600 includes first strands of solid material 1602 and second strands having a core/sheath arrangement 1604.

Example 5

Example 5 was made as described for Example 4 with the following exceptions.
Other process conditions are listed below:

| | |
|---|---|
| Quench takeaway speed | 6.1 m/min. |
| Web basis weight | 170 g/m² |

An optical microscope was used to measure web dimensions:

| | |
|---|---|
| Connecting strand width: | 0.2 mm |
| Connecting strand height: | 0.7 mm |
| Total caliper: | 0.9 mm |
| Crossweb repeat length: | 2.1 mm |
| Hollow strand inside area: | 0.4 mm² |
| Machine direction bond repeat | 11 mm |
| Machine direction bond length | 6.2 mm |

Figure 17:
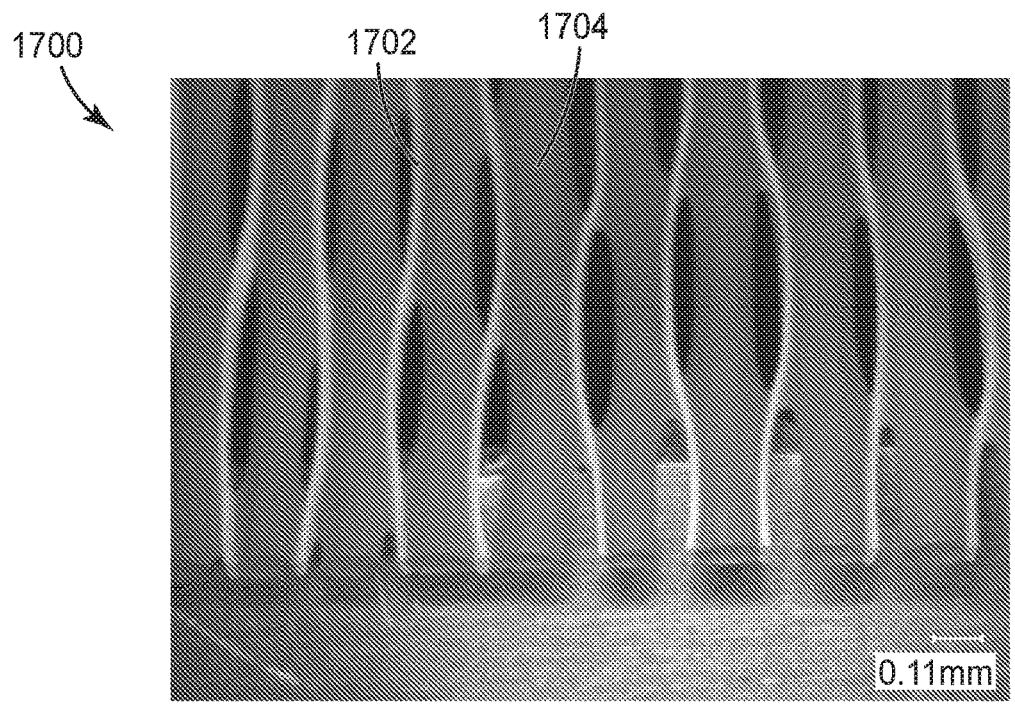
FIG. 17 is an optical image of Example 5.

A digital optical image of Example 5 netting 1700 is shown in FIG. 17. Netting 1700 includes first strands of solid material 1702 and second strands having a core/sheath arrangement 1704.

Example 6

Example 6 was made as described for Example 4 with the following exceptions.
Other process conditions are listed below:

| | |
|---|---|
| Quench takeaway speed | 1.5 m/min. |
| Web basis weight | 492 g/m² |

An optical microscope was used to measure web dimensions:

| | |
|---|---|
| Connecting strand width: | 0.3 mm |
| Connecting strand height: | 1.3 mm |
| Total caliper: | 2.3 mm |
| Crossweb repeat length: | 2.5 mm |
| Hollow strand inside area: | 2.9 mm² |
| Machine direction bond repeat | 4 mm |
| Machine direction bond length | 2 mm |

Figure 18:
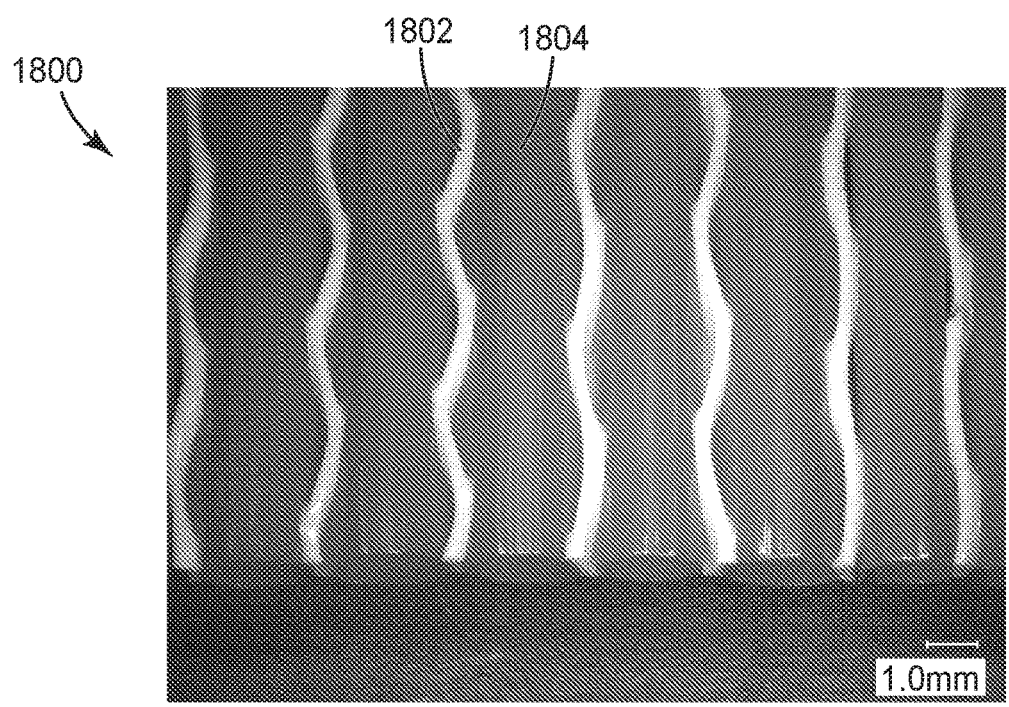
FIG. 18 is an optical image of Example 6.

A digital optical image of Example 6 netting 1800 is shown in FIG. 18. Netting 1800 includes first strands of solid material 1802 and second strands having a core/sheath arrangement 1804.

Examples 4A, 4B, 4C, 5A, 5B, and 5C

Circular samples with a diameter of 33 mm were punched out for testing from the tubular webs of Examples 4 and 5. For each tubular web, one sample was tested without further modification, and is referred herein as the respective reference sample (for Example 4A and Example 5A, respectively). Additional circular samples were modified by manually filling the nettings with thermal grease compounds. The channels remained unchanged and unfilled.

To fill the nettings samples with thermal grease, an amount of 1.5 gram of thermal grease was manually deposited onto the 33 mm circular samples. Two thermal greases were tested. One thermal grease was obtained under the trade designation "TC-5622" from Dow Corning, Midland, MI), and a second thermal grease was (obtained under the trade designation "MX-4 THERMAL COMPOUND" from Artic, Braunschweig, Germany). Using a wooden tongue depressor, the grease being tested was evenly spread into the netting sample. The excess material was removed and disposed of Samples were weighed before and after application of thermal grease in order to determine the mass of the thermal grease applied. All mass measurements were done on a high precision balance (obtained under the trade designation "XS205 DUALRANGE," from Mettler Toledo, Columbus, OH). Thermal conductivity, as reported by the supplier, of each thermal grease, is listed Table 1, below along with the amount of grease applied to each sample.

TABLE 1

| Example | Tubular Web | Thermal Grease | Thermal Conductivity of Thermal Grease, W/mK | Mass of Thermal Grease Added, grams |
|---------|-------------|----------------|----------------------------------------------|-------------------------------------|
| 4A | Example 4 | No thermal grease | N.A. | 0 |
| 5A | Example 5 | No thermal grease | N.A. | 0 |
| 4B | Example 4 | TC-5622 | 4.3 W/mK | 1.012 |
| 4C | Example 4 | MX-4 | 8.5 W/mK | 0.816 |
| 5B | Example 5 | TC-5622 | 4.3 W/mK | 0.591 |
| 5C | Example 5 | MX-4 | 8.5 W/mK | 0.617 |

Thermal Conductivity Test

The thermal conductivity of the films was measured according to ASTM D5470 ("Standard Test Method for Thermal Transmission Properties of Thermally Conductive Electrical Insulation Materials") using a thermal interface material tester (obtained under the trade designation "TIM TESTER Model 1400" from AnalysisTech, Wakefield, MA). The test temperature of the sample was 50° C. and the applied test pressure was set to 206 kPa. A thin layer of silicone oil (obtained under the trade designation "DC200", from AnalysisTech) was applied to a sample before placing it into the thermal interface material tester to reduce the contact resistance between test surfaces of the instrument and sample surfaces. For each test, a couple of droplets of silicone oil were deposited on the bottom and top of the sample using a pipette.

After applying the test pressure of 206 kPa, the sample of Examples 4B, 4C, 5B, and 5C exhibited no excess material being pressed out during testing.

The relative increase in thermal conductivity of the grease-filled specimens over the corresponding reference sample was calculated. Table 2, below, shows the measured thermal conductivity for the reference sample and the thermal grease-filled sample, which have the nettings loaded with thermal grease, and the relative increases.

TABLE 2

| Example | Measured Thermal Conductivity, W/mK | Relative Increase in Thermal Conductivity, percent |
|---------|-------------------------------------|---------------------------------------------------|
| 4A | 0.098 | N.A. |
| 5A | 0.088 | N.A. |
| 4B | 0.747 | 662.2 |
| 4C | 0.564 | 475.5 |
| 5B | 0.706 | 702.3 |
| 5C | 0.453 | 414.8 |

Examples 6A, 6B, and 6C

Circular samples with a diameter of 33 mm were punched out for testing from the tubular web Example 6. One sample was tested without further modification, and was referred to as the reference sample, Example 6A.

Additional samples were modified by injection of thermal grease compounds into the channels. Each thermal grease compound was transferred from the original packaging into a 10 ml syringe (obtained under the trade designation "BD 10 ML SYRINGE WITH LUER-LOK TIP", from Becton, Dickson and Company, Franklin Lakes, NJ). Subsequently, the grease was injected into each channel of the 33 mm diameter specimens individually using a syringe pump (obtained under the trade designation "NE-1000" from New Era Pump Systems Inc., Farmingdale, NY) and a 16G×1.5 in needle (obtained under the trade designation "BD PRECISIONGLIDE NEEDLE" from Becton, Dickson and Company). Any excess thermal grease on the specimens was removed by manually wiping it off using a paper towel. No thermal grease was applied to the netting part of the specimens. Table 3, below, summarizes the prepared samples.

TABLE 3

| Example | Extruded Profile | Thermal Grease Source | Thermal Conductivity of Thermal Grease, W/mK |
|---------|------------------|-----------------------|----------------------------------------------|
| 6A | Example 6 | No thermal grease | N.A. |
| 6B | Example 6 | "TC-5622" | 4.3 |
| 6C | Example 6 | "MX-4" | 8.5 |

The thermal conductivity of the films was measured. The relative increase in thermal conductivity of the grease-filled samples over the corresponding reference samples was calculated. Table 4, below, shows the measured thermal conductivity for the reference samples and the thermal grease-filled samples, which have the nettings loaded with thermal grease, and the relative increases.

TABLE 4

| Example | Measured Thermal Conductivity, W/mK | Relative Increase in Thermal Conductivity, percent |
|---------|-------------------------------------|---------------------------------------------------|
| 6A | 0.101 | N.A. |
| 6B | 0.584 | 478.2 |
| 6C | 0.355 | 251.5 |

The demarcation lines (or weld lines) formed when the melt streams merge together after exiting the die to form the bond regions can be detected when any of the Examples 1-3, for example, articles is analyzed using Differential Scanning calorimetry (DSC) (obtained under the trade designation "DISCOVERY DSC" from TA Instruments, New Castle, DE) to thermally analyze heat flow to detect differences in molecular structure. Regions 221 and 220 as shown in the FIG. 2 can be analyzed in the DSC. By using DSC measurements to compare temperature modulations, a region containing mostly a demarcation line (221) versus a region that did does not substantially contain material from the demarcation line (220) can be evidenced by a difference in heat flow/heat capacity consistent with an energy release or reduction in molecular orientation/internal stress, leading to evidence of a demarcation line. That is, the thermal signatures of the regions analyzed can be observed to have a combination of material thermal transitions and the material response to retained thermal/processing history. During sample preparation for Region 220, care should be taken to cut the sample in a substantially parallel direction to the demarcation line in a region free of demarcation line material. For further details, see, for example, application having U.S. Ser. No. 62/690,105, filed Jun. 26, 2018, the disclosure of which is incorporated herein by reference.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An article comprising a netting, the netting comprising an array of polymeric strands, wherein the polymeric strands are periodically joined together at bond regions throughout the array with spaces between adjacent strands, wherein at least a plurality of the strands are hollow polymeric strands, and wherein at least 50 percent by number of the strands do not cross over each other, and further comprising thermally conductive material filling at least some of spaces between strands.

2. The netting of claim 1, wherein the strands are within the same plane.

3. The netting of claim 1, wherein the netting has a thickness up to 750 micrometers.

4. The netting of claim 1 that is an extruded netting.

5. The netting of claim 1, wherein at least 25 percent by number hollow polymeric strands have a hollow cross-sectional area in a range from 0.2 to 1 mm$^2$.

6. The netting of claim 1, wherein the polymeric strands have an average width in a range from 10 micrometers to 500 micrometers.

7. The netting of claim 1, wherein the thermally conductive material comprises a thermal grease.

* * * * *